(12) United States Patent
Park et al.

(10) Patent No.: US 10,296,067 B2
(45) Date of Patent: May 21, 2019

(54) ENHANCED DYNAMIC CLOCK AND VOLTAGE SCALING (DCVS) SCHEME

(71) Applicant: QUALCOMM Incorporated, San Diego, CA (US)

(72) Inventors: Hee Jun Park, Sammamish, WA (US); Cristian Duroiu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 15/094,909

(22) Filed: Apr. 8, 2016

(65) Prior Publication Data
US 2017/0293340 A1    Oct. 12, 2017

(51) Int. Cl.
| G06F 1/26 | (2006.01) |
| G06F 1/324 | (2019.01) |
| G06F 1/3234 | (2019.01) |
| G06F 1/3287 | (2019.01) |
| G06F 1/329 | (2019.01) |
| G06F 1/3203 | (2019.01) |

(52) U.S. Cl.
CPC .............. *G06F 1/324* (2013.01); *G06F 1/329* (2013.01); *G06F 1/3243* (2013.01); *G06F 1/3265* (2013.01); *G06F 1/3287* (2013.01); *G06F 1/3203* (2013.01); *Y02D 10/126* (2018.01); *Y02D 10/152* (2018.01); *Y02D 10/171* (2018.01); *Y02D 10/24* (2018.01)

(58) Field of Classification Search
CPC ................................ G06F 1/24; G06F 1/3265
USPC ........................................................ 713/322
See application file for complete search history.

(56) References Cited

U.S. PATENT DOCUMENTS

| 7,451,333 | B2 | 11/2008 | Naveh et al. | |
| 8,250,395 | B2 | 8/2012 | Carter et al. | |
| 9,063,730 | B2 * | 6/2015 | Dighe | G06F 9/4893 |
| 2002/0184547 | A1 * | 12/2002 | Francis | G06F 1/3203 |
| | | | | 713/322 |
| 2003/0187531 | A1 * | 10/2003 | Circenis | G06F 9/5061 |
| | | | | 700/102 |
| 2006/0123422 | A1 * | 6/2006 | Felten Wesley Michael | |
| | | | | G06F 9/5083 |
| | | | | 718/105 |

(Continued)

FOREIGN PATENT DOCUMENTS

WO    WO-2015183525 A2    12/2015

OTHER PUBLICATIONS

Soc Definition (Year: 2018).*
International Search Report and Written Opinion—PCT/US2017/019410—ISA/EPO—dated May 18, 2017.

*Primary Examiner* — Volvick Derose
(74) *Attorney, Agent, or Firm* — Loza & Loza, LLP/Qualcomm

(57) ABSTRACT

In certain aspects, a method for frequency scaling comprises determining whether only a subset of multiple processors is active, wherein the multiple processors share one or more resources. The method also comprises increasing a frequency of at least one processor in the subset of the multiple processors if a determination is made that only the subset of the multiple processors is active and the frequency of the at least one processor is below a frequency threshold. This may be done, for example, to increase the time duration of an idle mode for the one or more shared resources and achieve an overall power reduction for a system including the multiple processors, the one or more shared resources, and/or other function blocks.

21 Claims, 17 Drawing Sheets

(56) References Cited

U.S. PATENT DOCUMENTS

| | | | |
|---|---|---|---|
| 2006/0149975 A1* | 7/2006 | Rotem | G06F 1/206 713/300 |
| 2007/0157046 A1* | 7/2007 | Samson | G06F 13/1636 713/323 |
| 2007/0260899 A1* | 11/2007 | Burton | G06F 1/26 713/300 |
| 2008/0005592 A1* | 1/2008 | Allarey | G06F 1/206 713/300 |
| 2009/0049314 A1* | 2/2009 | Taha | G06F 1/3203 713/300 |
| 2009/0204830 A1* | 8/2009 | Frid | G06F 1/3203 713/322 |
| 2009/0288092 A1* | 11/2009 | Yamaoka | G06F 9/5033 718/104 |
| 2009/0328055 A1* | 12/2009 | Bose | G06F 1/3203 718/105 |
| 2011/0113270 A1* | 5/2011 | Carter | G06F 1/324 713/320 |
| 2011/0119677 A1* | 5/2011 | Saito | G06F 9/5083 718/104 |
| 2011/0191783 A1* | 8/2011 | Le Moal | G06F 9/5077 718/105 |
| 2011/0238974 A1* | 9/2011 | Wells | G06F 1/3203 713/100 |
| 2012/0072746 A1* | 3/2012 | Sotomayor | G06F 1/324 713/320 |
| 2012/0110352 A1* | 5/2012 | Branover | G06F 1/206 713/300 |
| 2012/0117403 A1* | 5/2012 | Bieswanger | G06F 1/3206 713/322 |
| 2012/0159209 A1* | 6/2012 | Sternen; Patrick L | G06F 9/4893 713/320 |
| 2012/0185709 A1* | 7/2012 | Weissmann | G06F 1/3234 713/320 |
| 2012/0226865 A1* | 9/2012 | Choi | G06F 13/1642 711/121 |
| 2012/0297232 A1* | 11/2012 | Bircher | G06F 1/324 713/500 |
| 2012/0324248 A1* | 12/2012 | Schluessler | 713/300 |
| 2012/0331310 A1* | 12/2012 | Burns | G06F 1/26 713/300 |
| 2013/0055004 A1* | 2/2013 | Koniaris | G06F 1/10 713/501 |
| 2013/0074085 A1* | 3/2013 | Thomson | G06F 1/3203 718/102 |
| 2013/0097415 A1* | 4/2013 | Li | G06F 9/4893 713/100 |
| 2013/0103928 A1* | 4/2013 | Allarey | G06F 1/206 712/30 |
| 2013/0111226 A1* | 5/2013 | Ananthakrishnan | G06F 1/26 713/300 |
| 2013/0151879 A1* | 6/2013 | Thomson | G06F 1/329 713/322 |
| 2013/0196709 A1* | 8/2013 | Nho | G06F 1/324 455/550.1 |
| 2013/0232504 A1* | 9/2013 | Yan | G06F 1/3206 718/105 |
| 2014/0006838 A1* | 1/2014 | Linda | G06F 1/324 713/501 |
| 2014/0025853 A1* | 1/2014 | Fujita | G06F 13/405 710/110 |
| 2014/0095904 A1* | 4/2014 | Ananthakrishnan | G06F 1/3293 713/320 |
| 2014/0157284 A1* | 6/2014 | Sambasivan | G06F 9/4893 718/105 |
| 2014/0181555 A1* | 6/2014 | Bodas | G06F 9/4812 713/323 |
| 2014/0317389 A1* | 10/2014 | Wenisch | G06F 1/20 712/229 |
| 2014/0380071 A1* | 12/2014 | Lee | G06F 1/3296 713/321 |
| 2015/0046730 A1* | 2/2015 | Schluessler | G06F 1/3253 713/320 |
| 2015/0143148 A1* | 5/2015 | Park | G06F 1/3296 713/321 |
| 2015/0242243 A1 | 8/2015 | Balakrishnan et al. | |
| 2015/0261583 A1 | 9/2015 | Vanka et al. | |
| 2015/0317762 A1* | 11/2015 | Park | G06T 1/20 345/505 |
| 2015/0346800 A1* | 12/2015 | Kumar | G06F 1/206 713/323 |
| 2015/0370309 A1* | 12/2015 | Burstein | G06F 1/3209 713/323 |
| 2016/0011623 A1* | 1/2016 | Therien | G06F 1/3206 713/501 |
| 2016/0048199 A1* | 2/2016 | Kuroda | G06F 1/3287 713/323 |
| 2016/0210174 A1* | 7/2016 | Hsieh | G06F 9/5038 |
| 2016/0224053 A1* | 8/2016 | Koramutla | G06F 1/3228 |
| 2016/0327999 A1* | 11/2016 | Chang | G06F 1/3296 |
| 2017/0068309 A1* | 3/2017 | Toosizadeh | G06F 1/3296 |
| 2017/0249000 A1* | 8/2017 | Ragland | G06F 1/324 |

* cited by examiner

ENHANCED DYNAMIC CLOCK AND VOLTAGE SCALING (DCVS) SCHEME

BACKGROUND

Field

Aspects of the present disclosure relate generally to processors, and more particularly, to dynamic clock and voltage scaling (DCVS) of processors.

Background

A system on a chip (SoC) includes multiple processors integrated on a chip. For example, a SoC may include two or more of the following: a central processing unit (CPU), a display processor, a video encoder/decoder, an audio processor, a graphics processing unit (GPU), etc. Typically, a SoC includes resources that are shared among multiple processors. For example, the shared resources may include a shared memory interface configured to interface the processors to an external memory (e.g., dynamic random access memory (DRAM)). The shared resources may also include a shared power supply rail, a shared system bus, etc.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for frequency scaling is provided. The method comprises determining whether only a subset of multiple processors is active, wherein the multiple processors share one or more resources. The method also comprises increasing a frequency of at least one processor in the subset of the multiple processors if a determination is made that only the subset of the multiple processors is active and the frequency of the at least one processor is below a frequency threshold.

A second aspect relates to an apparatus for frequency scaling. The apparatus comprises means for determining whether only a subset of multiple processors is active, wherein the multiple processors share one or more resources. The apparatus also comprises means for increasing a frequency of at least one processor in the subset of the multiple processors if a determination is made that only the subset of the multiple processors is active and the frequency of the at least one processor is below a frequency threshold.

A third aspect relates to a system. The system comprises multiple processors, wherein the multiple processors share one or more resources. The system also comprises a resource manager configured to determine whether only a subset of the multiple processors is active, and to increase a frequency of at least one processor in the subset of the multiple processors if a determination is made that only the subset of the multiple processors is active and the frequency of the at least one processor is below a frequency threshold.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A system on a chip (SoC) includes multiple processors integrated on a chip. For example, a SoC may include two or more of the following: a central processing unit (CPU), a display processor, a video encoder/decoder, an audio processor, a graphics processing unit (GPU), etc. Typically, a SoC includes resources that are shared among multiple processors. For example, the shared resources may include a shared memory interface configured to interface the processors to an external memory.

Figure 1:
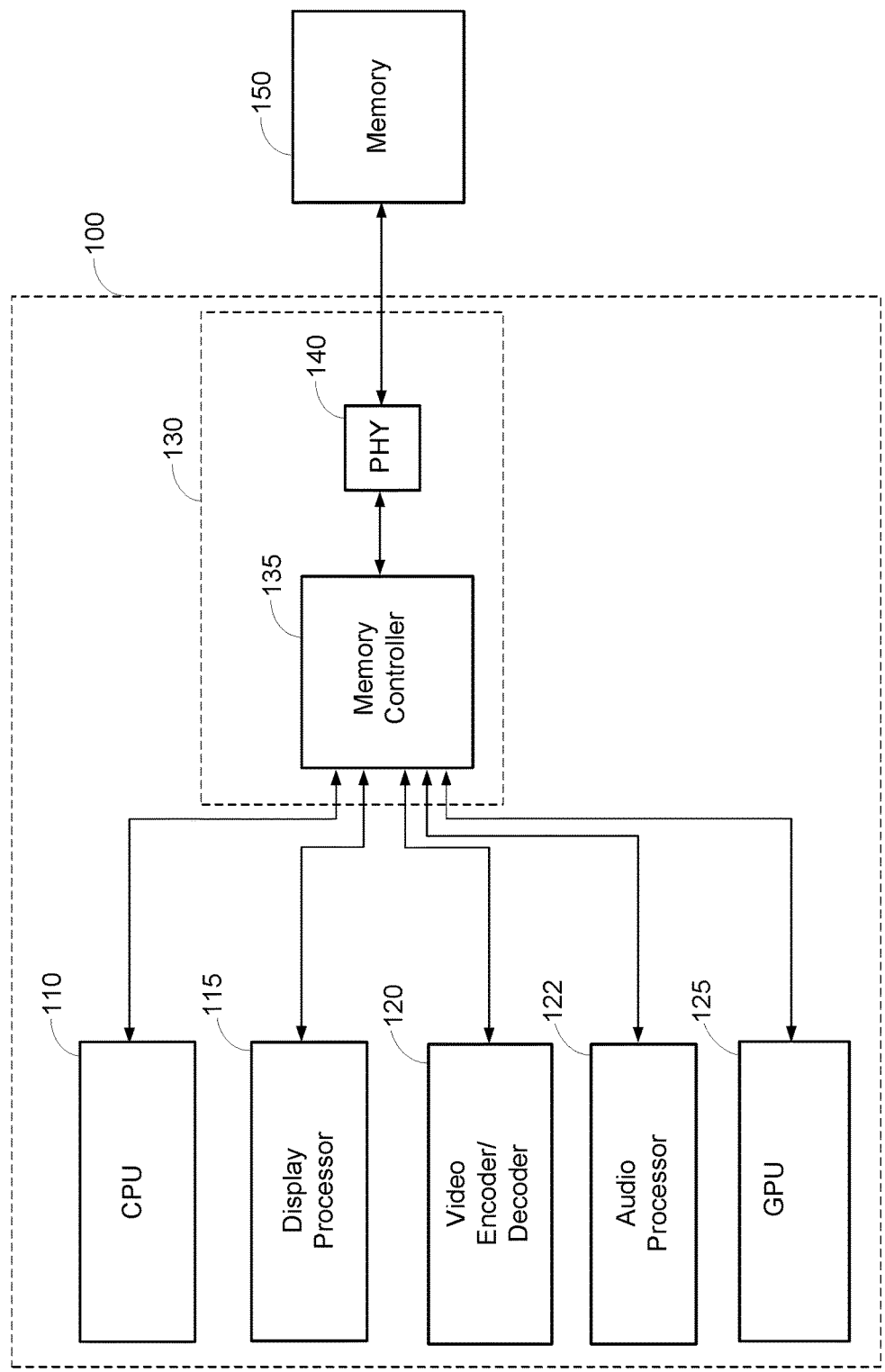
FIG. 1 shows an example of a system on a chip (SoC) including multiple processors according to certain aspects of the present disclosure.

In this regard, FIG. 1 shows an example of a SoC 100 including multiple processors and a shared memory interface 130 configured to interface the processors to an external memory 150 (e.g., dynamic random access memory (DRAM)). In this example, the multiple processors include a CPU 110, a display processor 115, a video encoder/decoder 120, an audio processor 122, and a GPU 125. The display processor 115, the video encoder/decoder 120, the audio processor 122, and the GPU 125 may be referred to as multimedia processors or cores. It is to be appreciated that the SoC 100 is not limited to the example shown in FIG. 1, and may include other combinations of processors.

The shared memory interface 130 includes a memory controller 135, and a physical (PHY) block 140. The memory controller 135 manages read/write operations of the memory 150 on behalf of the processors, as discussed further below. The memory controller 135 communicates with the memory 150 via the PHY block 140. The PHY block 140 may be coupled to the memory 150 via one or more lines (e.g., one or more data lines, one or more address lines, etc.), and may include one or more transceivers (note shown) for transmitting signals to and receiving signals from the memory 150 via the one or more lines. The PHY block 140 may also include timing circuits (not shown) for synchronizing incoming and/or outing going signals (e.g., with a data strobe signal). Although one PHY block 140 is shown in FIG. 1 for ease of illustration, it is to be appreciated that the memory interface 130 may include multiple PHY blocks.

To write data to the memory 150, a processor may send a write request to the memory controller 135. The write request may include the data and a logical address for the data. In response to the write request, the memory controller 135 may map the logical address to a physical address in the memory, and send corresponding command/address/data signals to the memory 150 via the PHY block 140 to write the data to the physical address in the memory 150.

To read data from the memory 150, a processor may send a read request to the memory controller 135. The read request may include a logical for the data to be read from the memory 150. In response to the read request, the memory controller 135 may map the logical address to a physical address in the memory, and send corresponding command/address signals to the memory 150 via the PHY block 140 to read the data from the physical address in the memory 150. Upon receiving the data from the memory 150, the memory controller 135 sends the data to the requesting processor.

The multiple processors 110, 115, 120, 122, and 125 may share the memory interface 130 on a time-shared basis. For example, the memory controller 135 may receive read/write requests from the processors, place the read/write requests in a buffer (not shown), and process the read/write requests in the buffer one at a time.

The shared resources in the SoC 100 may also include a shared system bus, a shared power supply rail, shared phase-locked loops (PLLs), etc. For example, the processors may use the shared system bus for inter-processor communication, communication with a user interface device, communication with a modem, etc. The shared PPLs may be used to provide clock signals to the processors for timing the operations of the processors.

The SoC may also include a power management system (not shown in FIG. 1) to manage the power of the SoC. For example, the power management system may gate the power and/or clock of a processor that is idle to conserve power. Gating the supply power of an idle processor conserves power by reducing the power leakage of the processor, and gating the clock of an idle processor conserves power by reducing the dynamic power consumption of the processor. The power management system may un-gate the power and clock of a processor that is active. The management system may also gate the power and/or clock of a shared resource (e.g., the memory controller 135) when the shared resource is not being used by a processor to conserve power, and un-gate the power and clock of the shared resource when the shared resource is being used by at least one processor. In another example, the power management system may gate the clock of a processor that is idle and reduce the supply voltage of the processor to a voltage that is sufficient to retain logic states in the processor.

An active system resource (e.g., processor or shared resource like memory) has a minimum baseline power that can include leakage power from static components and dynamic power from dynamic components such as running clocks necessary to synchronize and move data. The energy efficiency of a system is dictated by the resources that are active, the operating points (e.g., operating voltage and frequency) selected for each resource, the duration of time each resource is active, and the level of utilization of each resource while active.

The baseline power of a shared resource is consumed while active, regardless of the level of utilization of the shared resource. Accordingly, it may be more energy efficient to have multiple active processors use shared resources compared with having only one active processor use the shared resources while the other processors are idle. This is because having multiple active processors use the shared resources reduces the amount of time that the shared resources need to stay active to serve the processors. In contrast, having only one active processor use the shared resources requires the shared resources to stay active and consume power to serve only one processor. Current power management schemes do not consider the overall energy efficiency of the processors and shared resources (e.g., do not consider whether only one active processor is using the shared resources).

Embodiments of the present disclosure provide systems and methods that increase energy efficiency by determining whether only one active processor (e.g., the CPU 110) is using shared resources, and, in response to determining that only active processor is using the shared resources, speeding up the processor (e.g., boosting the clock frequency of the processor) to reduce the amount of the time that the shared resources need to stay active. Exemplary embodiments of the present disclosure will now be described with reference to FIGS. 2 and 3 below.

Figure 2:
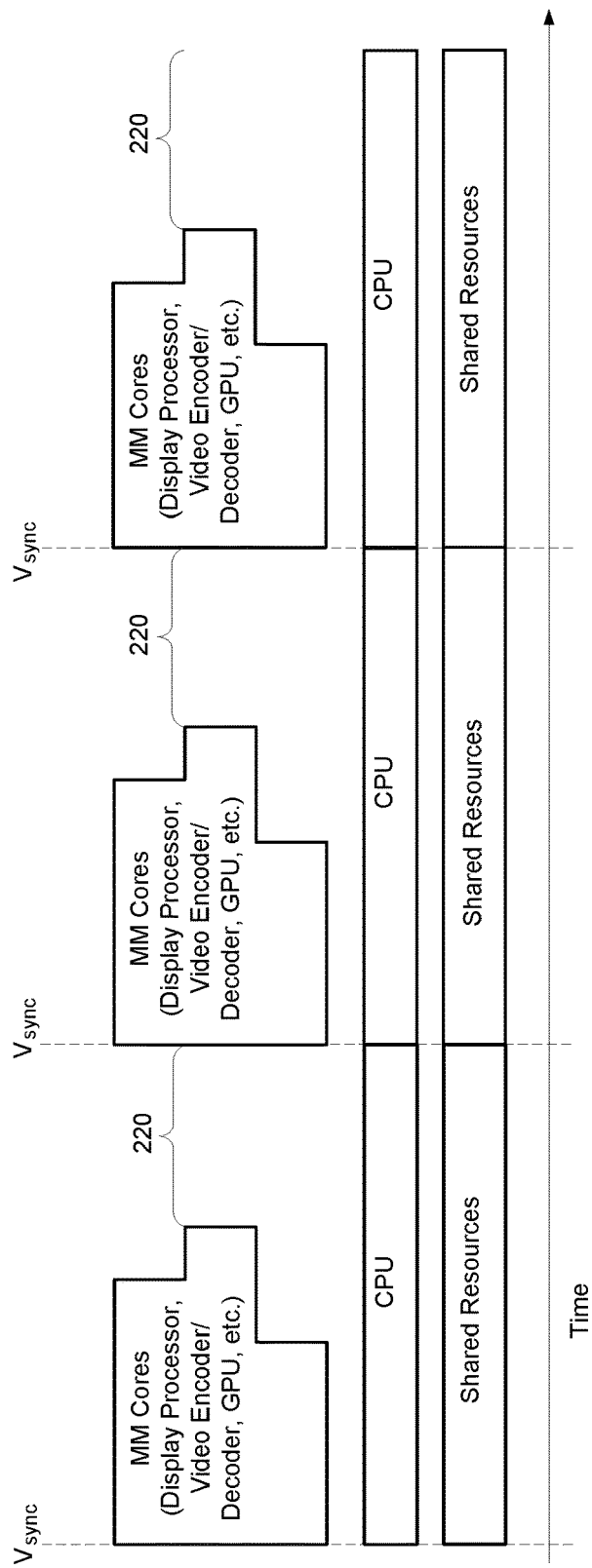
FIG. 2 is a timeline illustrating exemplary activity of multiple processors and shared resources over time according to certain aspects of the present disclosure.

FIG. 2 shows an exemplary timeline illustrating activity of the CPU 110, multimedia processors, and shared resources over time. In this example, the multimedia processors (e.g., the display processor 115, the video encoder/decoder 120, and/or the GPU 125) process frames (e.g., for display to a user) at a certain frame rate (e.g., 30 frames per second (FPS)). In the example in FIG. 2, the start of each frame is signaled by the signal $V_{sync}$. For each frame, there is an inter-frame duration 220 between the time the multimedia processors finish processing the frame and the start of the next frame. During each inter-frame duration 220, the multimedia processors are in an idle state to conserve power.

In the example in FIG. 2, the CPU 110 remains active (e.g., processing OS/Apps/driver related tasks) during the inter-frame time durations 220. As a result, during the inter-frame time durations 220, the CPU 110 is the only active processor using the shared resources, and the shared resources (e.g., memory interface 130) remain active to serve only the CPU 110. Keeping the shared resources active when only the CPU is active may be energy inefficient.

To increase energy efficiency, a resource manager according to certain aspects of the present disclosure determines whether only one of multiple processors (e.g., the CPU 110) is active and using shared resources (e.g., the memory controller 135). In response to determining that only one of the multiple processors (e.g., the CPU 110) is active and using the shared resources, the resource manager may speed up the one processor (e.g., by increasing the clock frequency of the processor). This allows the processor to finish (complete) its tasks faster and enter the idle state sooner. As a result, the shared resources can be placed in the idle state for longer durations for increased energy efficiency.

Figure 3:
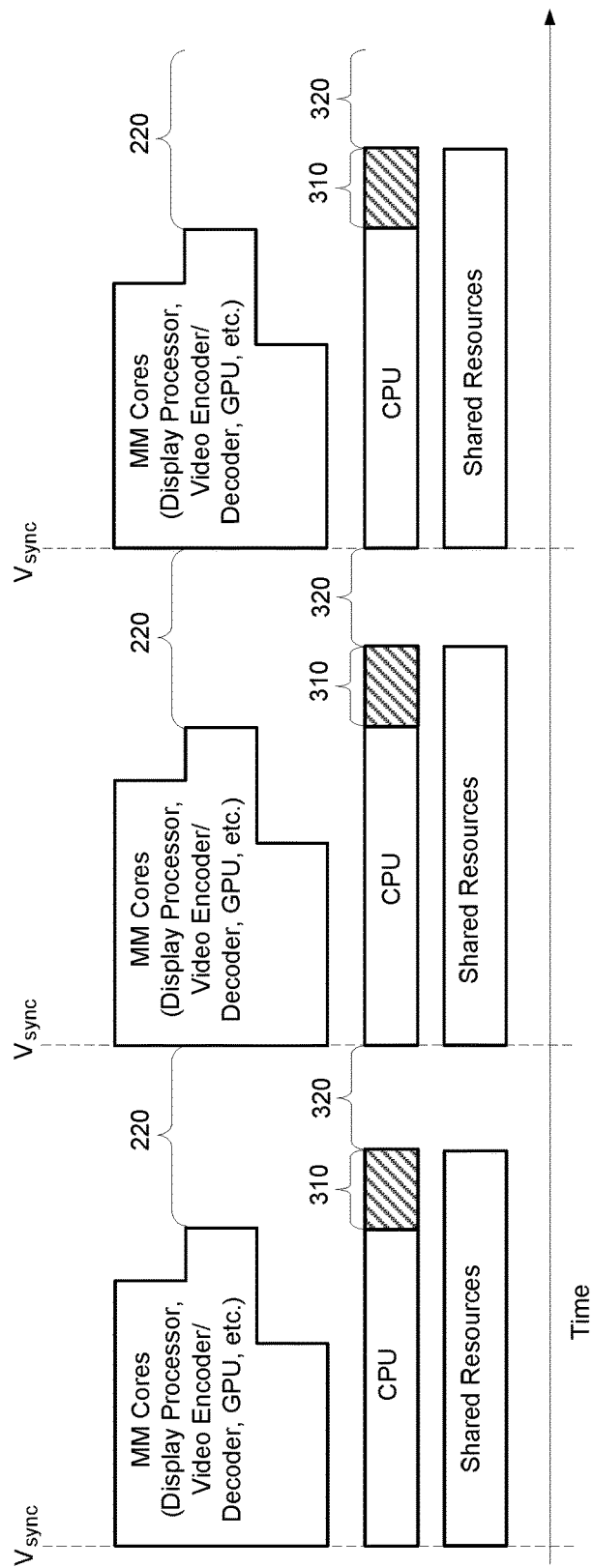
FIG. 3 is a timeline illustrating an example in which a processor is sped up to increase idle durations of shared resources according to certain aspects of the present disclosure.

In this regard, FIG. 3 shows an exemplary timeline in which the resource manager speeds up the CPU 110 (e.g., boosts the frequency of the CPU 110) in response to a determination that the CPU 110 is the only active processor using the shared resources in FIG. 2. The time durations 310 during which the CPU 110 is sped up are shaded. Because the CPU 110 is sped up, the CPU 110 processes tasks faster and is able to enter the idle state sooner. As a result, the resource manager is able to place the shared resources in the idle state (e.g., power gate and/or clock gate the shared resources) to reduce energy inefficiency. As shown in the example in FIG. 3, for each frame, the resource manager places the shared resources in the idle state during a time duration 320 between the time that the CPU 110 completes its tasks for the frame and the start of the next frame.

It is to be appreciated that the time for the multimedia processors to finish processing a frame need not be the same for each frame, and may therefore vary. In any case, the multimedia processors may finish processing each frame before the start of the next frame resulting in an inter-frame time duration 220, during which time the resource manager may speed up the CPU 110 to improve energy efficiency.

As discussed above, in response to a determination that only one (e.g., CPU 110) of multiple processors is active and using shared resources, the resource manager may speed up the one processor to increase the idle time of the shared resources. Speeding up the processor (e.g., increasing the clock frequency of the processor) may increase the power of the processor. However, the amount of energy saved by increasing the idle time of the shared resources may outweigh the power increase of the processor, resulting in an overall increase in energy efficiency.

Figure 4:
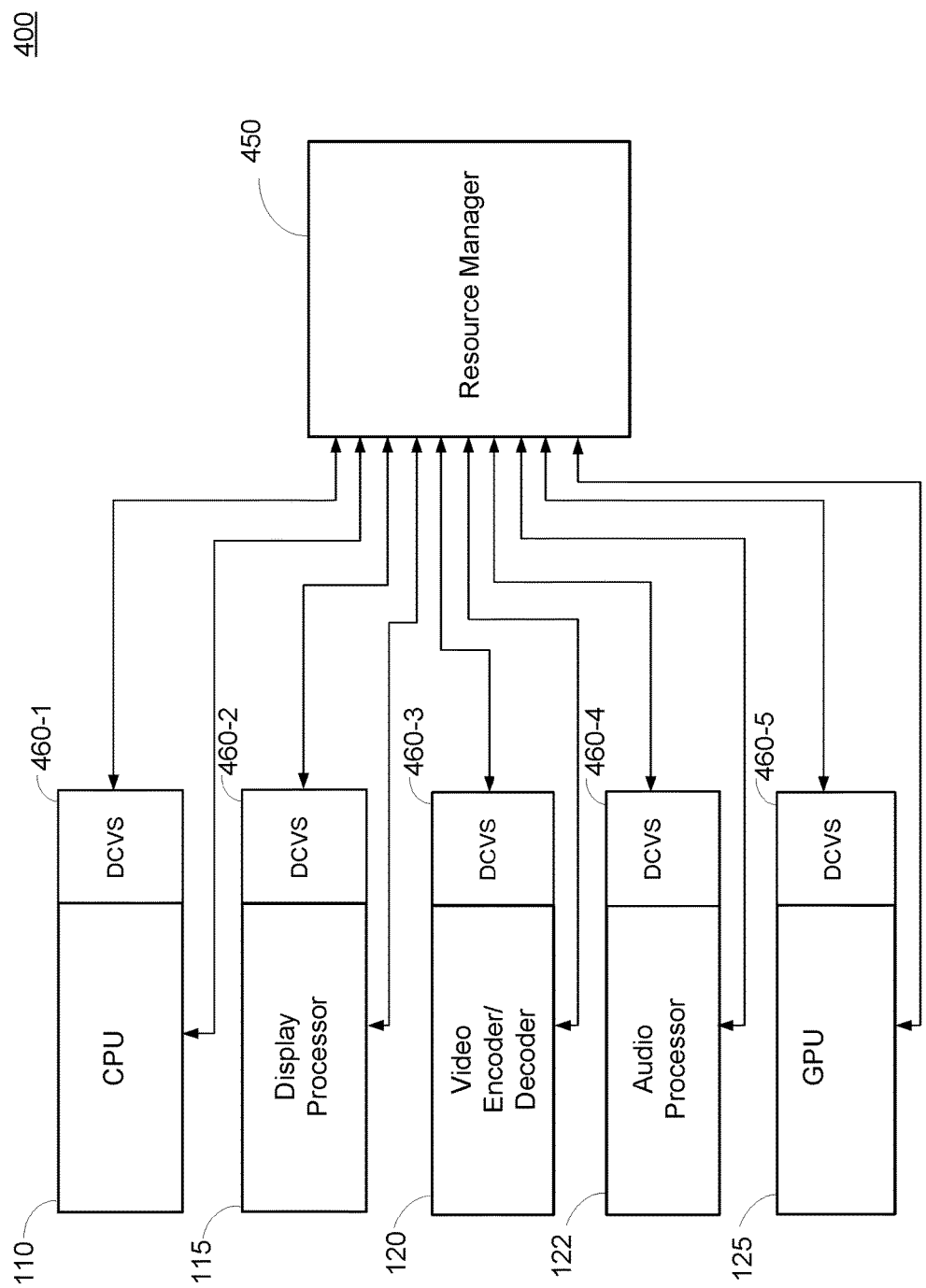
FIG. 4 shows an example of a SoC including a resource manager according to certain aspects of the present disclosure.

FIG. 4 shows an exemplary SoC 400 according to certain aspects of the present disclosure. The SoC 400 includes the processors 110, 115, 120, 122 and 125 shown in FIG. 1. The SoC 400 also includes a resource manager 450, and a plurality of dynamic clock voltage scaling (DCVS) circuits 460-1 to 460-5, in which each of the DCVS circuits is configured to dynamically scale the clock frequency and/or supply voltage of a respective one of the processors. Although the DVCS circuits are shown separately in FIG. 1 for each of illustration, it is to be appreciated that the DCVS circuits may share one or more components, as discussed further below. The SoC 400 may also include the memory interface 130, which is not shown in FIG. 4 for ease of illustration.

In this example, each of the processors 110, 115, 120, 122 and 125 may be configured to communicate a respective state (e.g., active state, idle state, etc.) to the resource manager 450. For example, each processor may be configured to write one or more bits to a register (not shown) indicating the state (e.g., active state, idle state, etc.) of the processor. In this example, just before entering the idle state (e.g., after completing its tasks for a current frame), the processor may write one or more bits to the register indicating the processor is in the idle state. When the processor wakes up from the idle state (e.g., at the start of the next frame), the processor may write one or more bits to the register indicating the processor is in the active state. In addition, shared sources (not shown) on the SoC 400 may also communicate their states (e.g., active state, idle state, etc.) to the resource manager 450 by writing bits indicating their states to the register.

Thus, in this example, the resource manager 450 is able to determine the states of the processors and shared resources by looking up their states in the register. This allows the resource manager 450 to determine whether only one of the processors (e.g., CPU 110) is active and using the shared resources. For example, when the resource manager 450 detects that one of the processors is active, the remaining processors are idle and the shared resources are active, the resource manager 450 may determine that only one of the processors (e.g., CPU 110) is active and using the shared resources (e.g., the memory controller 135).

In another example, each of the processors 110, 115, 120, 122 and 125 may be configured to send an active signal to the resource manager 450 (e.g., via a dedicated line) when the processor is active. In this example, the resource manager 450 may determine that a processor is active when the resource manager 450 receives an active signal from the processor, and determine that a processor is idle when the resource manager 450 does not receive an active signal from the processor. For example, the resource manager 450 may determine that only one of the processors is active when the resource manager 450 only receives an active signal from one of the processors.

In yet another example, the power management system (not shown) may communicate the states of the processors and shared resources to the resource manager 450. In this example, the power management system may write the states of the processors and shared resources in a register in the resource manager or any other register that is accessible to the resource manager.

In one example, the resource manager 450 may make a determination whether only one of the processors 110, 115, 120, 122 and 125 is active and using the shared resources each time the state(s) of one or more of the processors changes. In this example, the resource manager 450 may detect a change in the state(s) of one or more of the processors when one or more of the states in the register is updated. When a state change is detected, the resource manager 450 may examine the states of the processors in the register to determine whether only one of the processors is active and using the shared resources. For example, the resource manager 450 may determine that only one of the processors is active and using the shared resources if one of the processors is active, the remaining processors are idle and the shared resources are active. In response to a determination that only one of the processors 110, 115, 120, 122 and 125 is active and using the shared resources, the resource manager 450 may speed up the one processor to increase the idle time of the shared resources. For example, the resource manager 450 may speed up the processor by instructing the respective DCVS circuit to increase the clock frequency of the processor. The respective DCVS circuit may increase the clock frequency by a certain percentage (e.g., 10%, 20%, or a higher level) or increase the clock frequency to a certain frequency, as discussed further below.

In one implementation, the resource manager 450 quickly determines which processors are active and quickly adjusts DCVS control based on the determination. For example, the resource manager 450 determines when only one processor is active during a frame, and speeds up the one processor within the frame if a determination that only the one processor is active. However, it is to be appreciated that the present disclosure is not limited to this example.

For instance, in another implementation, the resource manager 450 may use average processor activity information to determine a longer term DCVS policy. In this implementation, the DCVS policy control can be done over several frames based on average activities of the processors over the past several frames. For example, the resource manager 450 may determine the average activity of each one of the processors over the past several frames. The average activity information may come from an activity monitor, an operating system, etc. The average activity for each processor may be in the form of a percentage of time that the processor is active over the past several frames or another form.

In this example, the resource manager 450 may determine that one of the processors is active alone during at least part of the past several frames when the average activity of the processor is greater than the average activity of any one of the other processors by at least a certain amount (e.g., by at least a certain percentage). If the resource manager 450 determines that a processor is active alone during at least part of the past several frames, then the resource manager 450 may speed up the processor during one or more subsequent frames. In this case, the resource manager 450 may instruct the respective DCVS circuit to increase the clock frequency by a certain percentage (e.g., 10%, 20%, or a higher level) or increase the clock frequency to a certain frequency. Thus, the speed-up of a processor can happen over multiple frames based on the activity history accumulated over the past several frames.

Therefore, in the present disclosure, it is to be appreciated that the resource manager 450 may determine whether a processor is active alone during a current frame (e.g., based on hardware signaling) or determine whether a processor is active alone based on activity information over several frames (e.g., average activities of the processors over several frames).

As discussed above, in cases where speeding up a processor increases the idle time of shared resources, the amount of energy saved by the increase in the idle time of the shared resources may outweigh the power increase of the processor, resulting in an increase in overall energy efficiency. However, the increase in overall energy efficiency achieved by speeding up the processor may diminish at higher clock frequencies.

Figure 5:
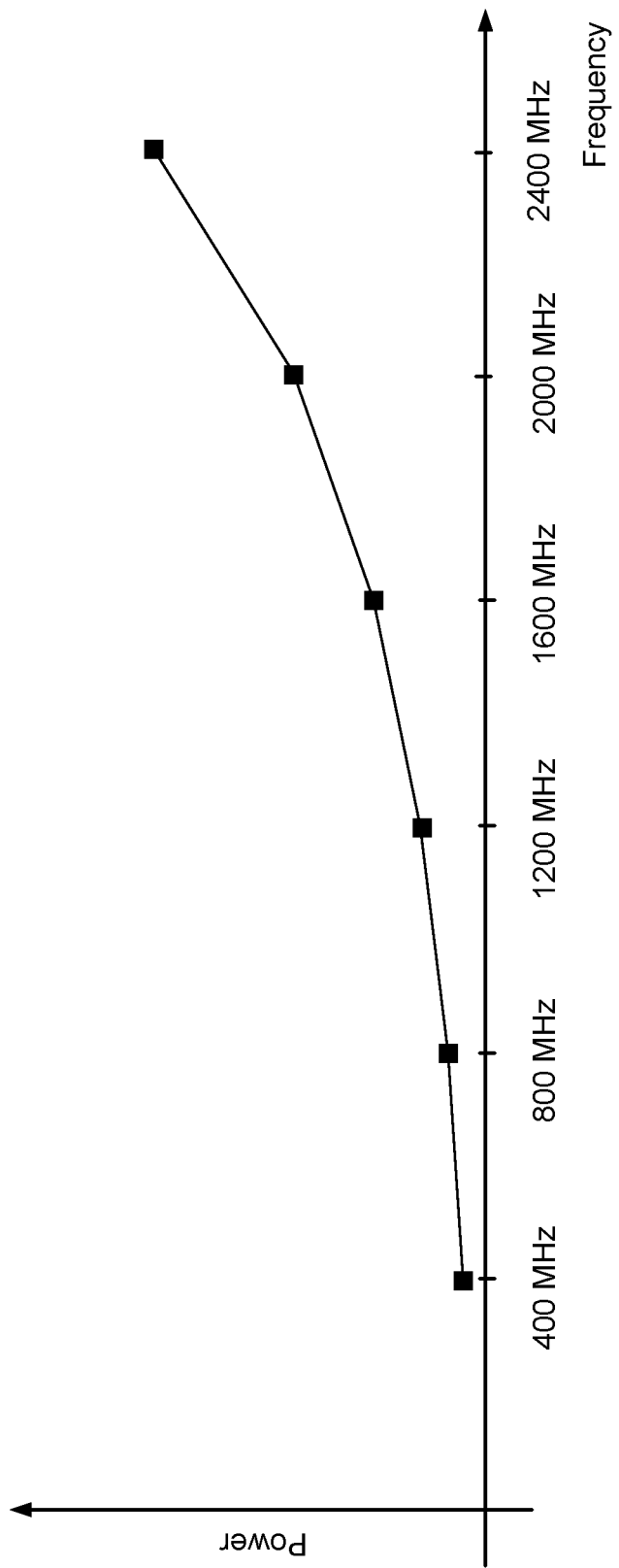
FIG. 5 is a plot illustrating an example of power of a processor as a function of clock frequency.

This may be explained with reference to FIG. 5, which shows an example of the power of a processor as a function of clock frequency. As shown in this example, the power of the processor increases at a faster rate at higher clock frequencies than lower clock frequencies. This is because an increase in the clock frequency may be accompanied by an increase in the supply voltage of the processor in order to enable transistors in the processor to properly switch at the increased frequency. The increase in the supply voltage further increases the dynamic power of the processor, which is approximately a quadratic function of the supply voltage. Therefore, speeding up the clock frequency of the processor from a high frequency may result in a larger increase in power than speeding up the clock frequency of the processor from a low frequency for a same percentage increase in the clock frequency.

Accordingly, in certain aspects, the resource manager 450 may take into account the current clock frequency of a processor in making a determination whether to speed up the processor. For example, after determining that the processor is the only one of multiple processors that is active and using shared resources, the resource manager 450 may compare the current clock frequency of the processor with a frequency threshold. If the current clock frequency is below the frequency threshold, then the resource manager 450 may speed up the processor to increase the idle time of the shared resources. If the current clock frequency is equal to or above the frequency threshold, then the resource manager 450 may leave the processor speed alone. In this case, speeding up the processor may result in little to no increase in overall energy efficiency.

In certain aspects, when the resource manager 450 determines that the current clock frequency of the processor is below the frequency threshold, the resource manager 450 may speed up the processor by increasing the clock frequency of the processor to the frequency threshold. Alternatively, the resource manager may speed up the processor by increasing the clock frequency of the processor by a certain percentage (e.g., 10%, 20%, or a higher level).

Aspects of the present disclosure may be incorporated into a DCVS scheme for a processor (e.g., the CPU 110). Before discussing these aspects of the present disclosure in greater detail, it may be helpful to describe a conventional DCVS scheme for a processor (e.g., the CPU 110). The conventional DCVS scheme considers the workload of the processor in setting the clock frequency and supply voltage of the processor. However, the conventional DCVS scheme does not consider the states of other processors that share resources with the processor, as discussed further below.

Figure 6:
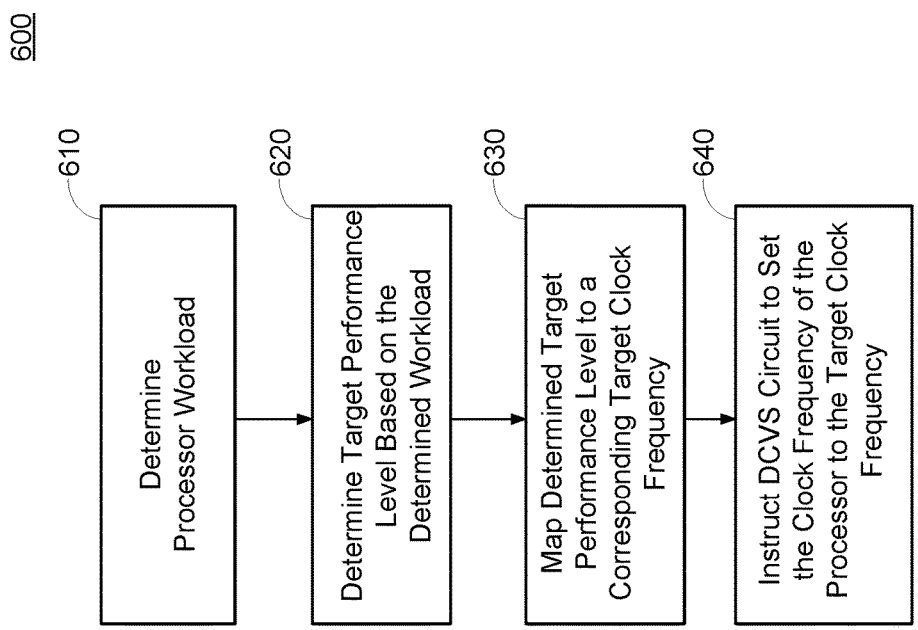
FIG. 6 shows an example of a dynamic clock voltage scaling (DCVS) scheme according to certain aspects of the present disclosure.

FIG. 6 is a flowchart illustrating the conventional DCVS scheme 600. In block 610, a workload of the processor (e.g., the CPU 110) is determined. For example, the workload may be given as a percentage of time that the processor is busy executing instructions. The workload may be determined by a program (e.g., operating system) running on the processor, a performance monitor, etc.

In block 620, a target performance level is determined for the processor based on the workload. For example, if the determined workload is higher than a first workload threshold, then the target performance level may be greater than the current performance level of the processor. In this case, the performance level of the processor is increased. In another example, if the workload is lower than a second workload threshold, then the target performance level may be lower than the current performance level of the processor. In this case, the performance level of the processor is decreased. The reduced performance level may reduce power consumption while still allowing the processor to complete one or more tasks within an acceptable period of time.

Figure 7:
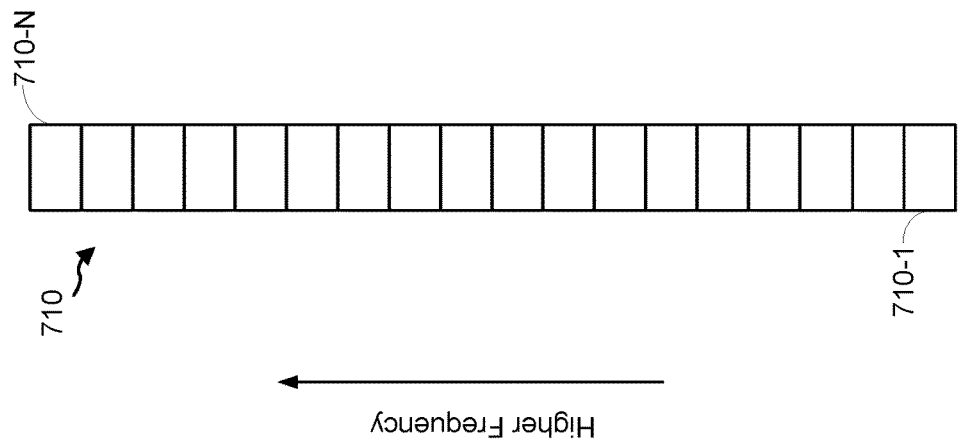
FIG. 7 shows an example of available clock frequencies for a processor according to certain aspects of the present disclosure.

In block 630, the target performance level is mapped to one of a plurality of available clock frequencies that enables the processor to meet the target performance level. For example, the target performance level may be mapped to the lowest one of the plurality of available clock frequencies that enables the processor to meet the target performance level. In this regard, FIG. 7 shows an example of a plurality of available clock frequencies 700 for the processor. In FIG. 7, the plurality of clock frequencies 700 are labeled 710-1 to 710-N, in which the arrow in FIG. 7 points in the direction of increasing frequency. In this example, each of the available clock frequencies 710-1 to 710-N may be paired with a supply voltage that enables transistors in the processor to switch fast enough to operate reliably at the clock frequency. Thus, in this example, the target performance level may be mapped to a corresponding clock frequency and supply voltage (i.e., a corresponding frequency-voltage pair) that enables the processor to meet the target performance level. The clock frequency and supply voltage to which the target performance level is mapped may be referred to as the target clock frequency and target supply voltage, respectively.

In block 640, the DCVS circuit (e.g., 460-1) of the processor is instructed to set the clock frequency of the processor (e.g., CPU 110) to the target clock frequency. The DCVS circuit may also be instructed to set the supply voltage of the processor to the target supply voltage.

The DCVS scheme 600 illustrated in FIG. 6 considers the workload of the processor in setting the clock frequency and/or supply voltage of the processor. In this regard, the DCVS scheme 600 may be configured to set the clock frequency and/or supply voltage to optimize the energy efficiency of the processor based on the workload of the processor. However, the DCVS scheme 600 does not consider the overall energy efficiency of the processor and shared resources, and therefore may not be optimized for overall energy efficiency, as discussed further below.

Figure 8:
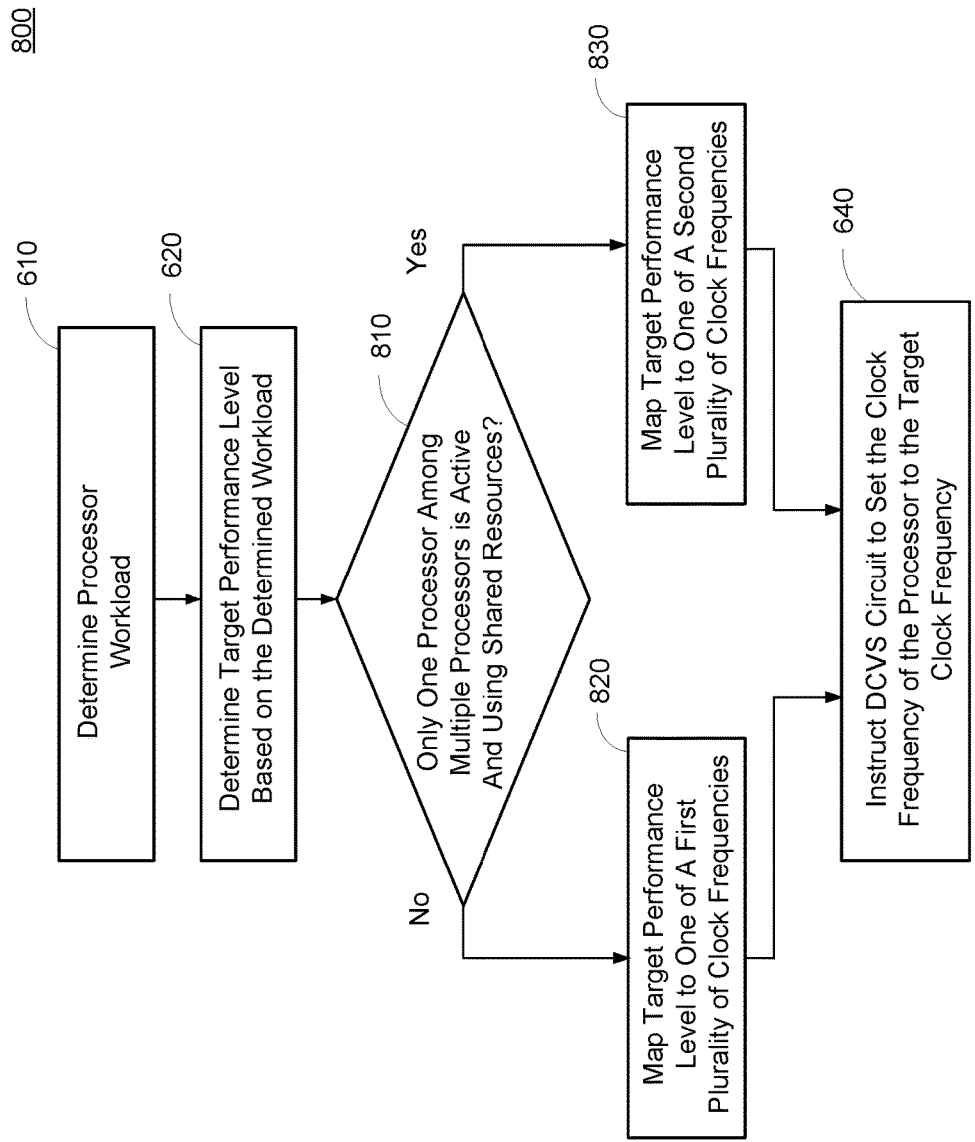
FIG. 8 shows an exemplary DCVS scheme in which efficiency of shared resources is taken into account according to certain aspects of the present disclosure.

FIG. 8 is a flowchart illustrating a DCVS scheme 800 for a processor (e.g., the CPU 110) according to certain aspects of the present disclosure. The DCVS scheme 800 may be performed by the resource manager 450. The DCVS scheme 800 includes blocks 610 and 620 from the DCVS scheme 600 in FIG. 6. Thus, the DCVS scheme 800 includes determining the workload of the processor (e.g., the CPU 110), and determining a target performance level for the processor based on the workload, similar to the DCVS scheme 600 in FIG. 6.

In block 810, a determination is made whether the processor is the only active one of multiple processors (e.g., CPU 110, display processor 115, video encoder/decoder 120, audio processor 122, and GPU 125) using shared resources (e.g., the memory interface 130). If a determination is made that the processor is not the only active processor using the shared resources, then the DCVS scheme 600 proceeds to block 820. In block 820, the target performance level determined in block 620 is mapped to one of a first plurality of clock frequencies 910 shown in FIG. 9. For example, the target performance level may be mapped to a lowest one of the first plurality of clock frequencies 910 that enables the processor to meet the target performance level. In this example, the first plurality of clock frequencies 910 comprises the same clock frequencies 710-1 to 710-N as the plurality of available clock frequencies 700 in FIG. 7. Thus, for the case in which the processor is not the only active processor using the shared resources (i.e., more than one active processor is using the shared resources), the DCVS scheme 800 may map the target performance level to the same clock frequency as the DCVS scheme 600 in FIG. 6.

If a determination is made in block 810 that only one processor is active and using the shared resources, then the DCVS scheme 800 proceeds to block 830. In block 830, the target performance level determined in block 620 is mapped to one of a second plurality of clock frequencies 920 shown in FIG. 9. For example, the target performance level may be mapped to a lowest one of the second plurality of clock frequencies 920 that enables the processor to meet the target performance level.

Figure 9:
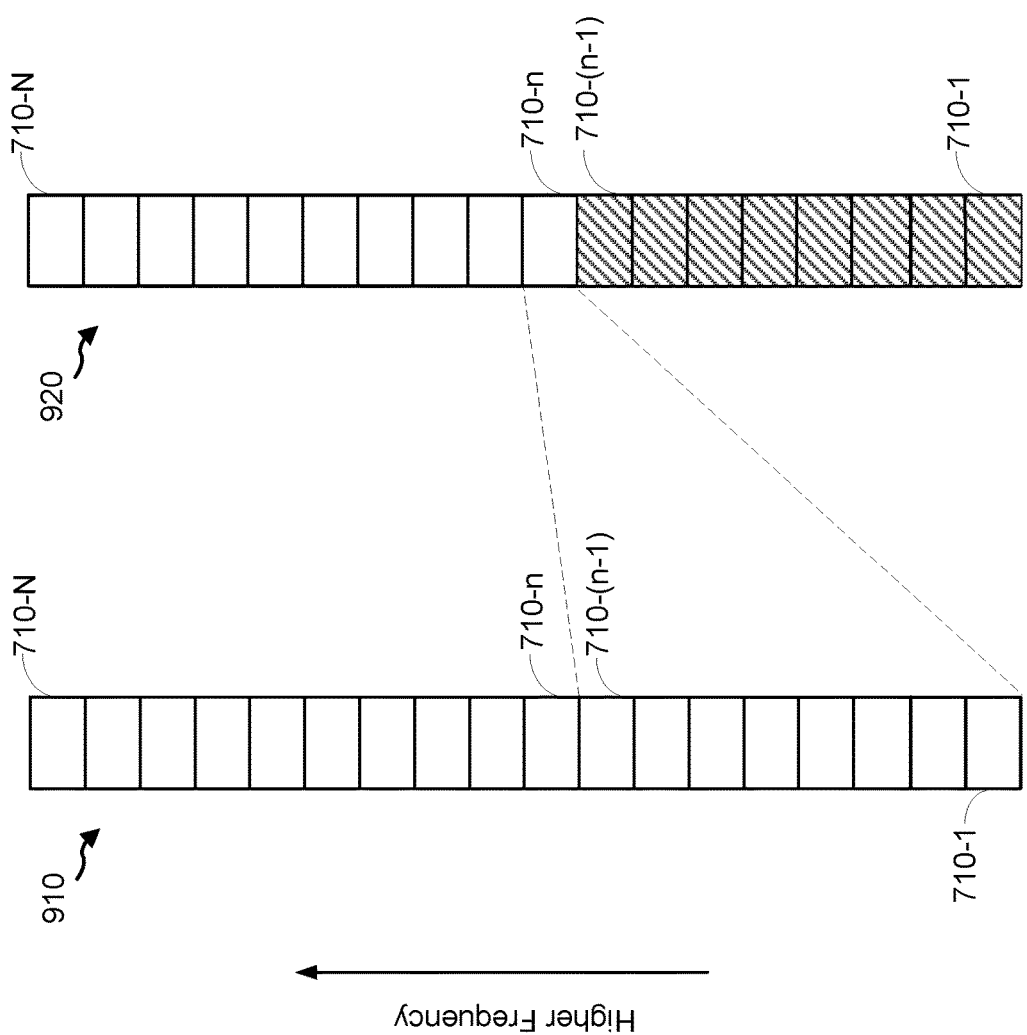
FIG. 9 shows an example of first and second pluralities of clock frequencies for a processor according to certain aspects of the present disclosure.

The second plurality of clock frequencies 920 comprises clock frequencies 710-n to 710-N, in which the lowest (minimum) clock frequency in the second plurality of clock frequencies 920 is clock frequency 710-n. The second plurality of clock frequencies 920 excludes the clock frequencies 710-1 to 710-(n−1) below clock frequency 710-n. In other words, the clock frequencies 710-1 to 710-(n−1) are disabled. In FIG. 9, the clock frequencies 710-1 to 710-(n−1) excluded from the second plurality of clock frequencies 920 are shaded. Thus, a target performance level that is mapped to one of clock frequencies 710-1 to 710-(n−1) in block 820 is instead mapped to clock frequency 710-n in block 830 since clock frequency 710-n is the lowest (minimum) clock frequency in the second plurality of clock frequencies 920. This is equivalent to speeding up the clock frequency of the processor relative to the clock frequency set in block 820 for the case in which block 820 maps the target performance level to one of clock frequencies 710-1 to 710-(n−1). For the case in which the target performance level is mapped to clock frequency 710-n or higher in block 820, the processor speed is not boosted in block 830 relative to block 820.

The clock frequency to which the processor is mapped in block 820 or block 830 may be referred to as the target clock frequency. Since each of the clock frequencies has a corresponding supply voltage, mapping the target performance level to one of the clock frequencies also maps the target performance level to the corresponding supply voltage, which may be referred to as the target supply voltage.

In block 640, the DCVS circuit (e.g., 460-1) of the processor is instructed to set the clock frequency of the processor (e.g., CPU 110) to the target clock frequency. The DCVS circuit may also be instructed to set the supply voltage of the processor to the target supply voltage.

Thus, the DCVS scheme 800 considers the overall energy efficiency of the processor and shared resources, and therefore may provide increased overall energy efficiency compared with the DCVS scheme 600, which does not consider the energy efficiency of shared resources.

In one example, the resource manager 450 may perform the DCVS scheme 800 for the CPU 110 in FIG. 4, in which case the processor in FIG. 8 refers to the CPU 110. In this example, the resource manager 450 may determine that the CPU 110 is the only active processor using the shared resources when the CPU is active and the multimedia processors (e.g., the display processor 115, the video encoder/decoder 120, the audio processor 122, and the GPU 125) are idle. In this example, the shared resources may include the memory interface 130.

In this example, the DCVS scheme 800 may periodically speed up the CPU 110 for the multimedia use case illustrated in FIG. 3. For example, suppose that the clock frequency of the CPU 110 is set to a clock frequency below clock frequency 710-*n* based on the workload of the CPU 110. In this example, the clock frequency of the CPU 110 is below clock frequency 710-*n* during the durations in which one or more of the multimedia processors are active. During the durations 220 in which the multimedia processors are idle, the DCVS scheme 800 speeds up the clock frequency of the CPU 110 to clock frequency 710-*n*. This is because clock frequencies below clock frequency 710-*n* are disabled when the CPU 110 is the only active one of the processors (e.g., the CPU 110, the display processor 115, the video encoder/decoder 120, the audio processor 122, and the GPU 125) using the shared resources (e.g., memory interface 130).

It is to be appreciated that embodiments of the present disclosure are not limited to speeding up a processor for the case in which the processor is the only active processor using shared resources. For example, a SoC may include two or more CPUs in addition to multimedia processors (e.g., the display processor 115, the video encoder/decoder 120, the audio processor 122, and the GPU 125). In this example, the resource manager 450 may speed up the two or more CPUs when the two or more CPUs are active and using shared resources, and the multimedia processors are idle, as discussed further below.

Figure 10:
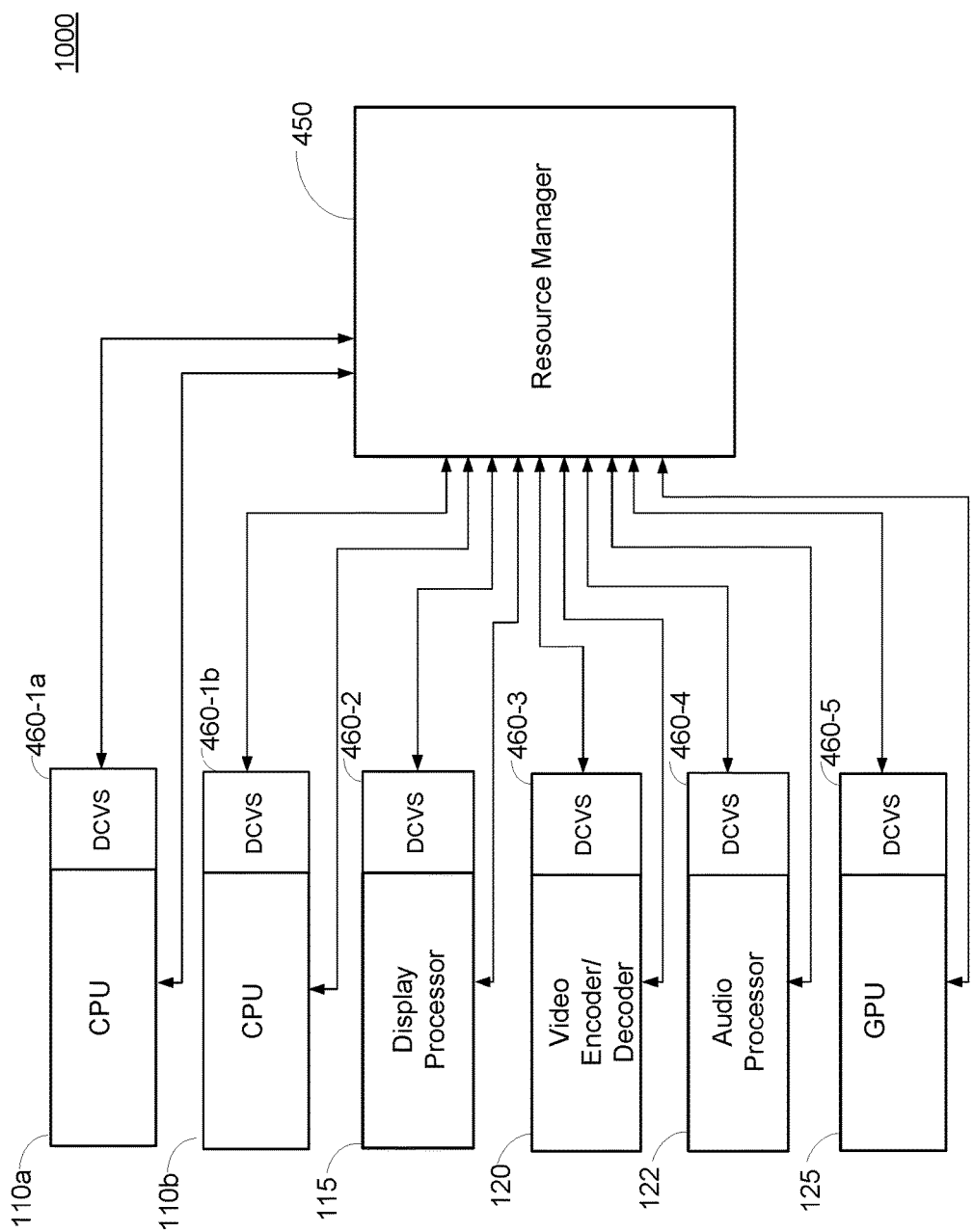
FIG. 10 shows an example of a SoC including two CPUs according to certain aspects of the present disclosure.

FIG. 10 shows an example of a SoC 1000 according to certain aspects. The SoC 1000 includes the multimedia processors 115, 120, 122 and 125 and respective DCVS circuits 460-2 to 460-5 shown in FIG. 4. The SoC also includes two CPUs 110*a* and 110*b* and respective DCVS circuits 460-1*a* and 460-1*b*. In this example, each of the CPUs 110*a* and 110*b* may be configured to communicate a respective state (e.g., active state, idle state, etc.) to the resource manager 450 in a manner similar to the manner discussed above with reference to FIG. 4. The SoC 1000 may also include the memory interface 130, which is not shown in FIG. 10 for ease of illustration.

Figure 11:
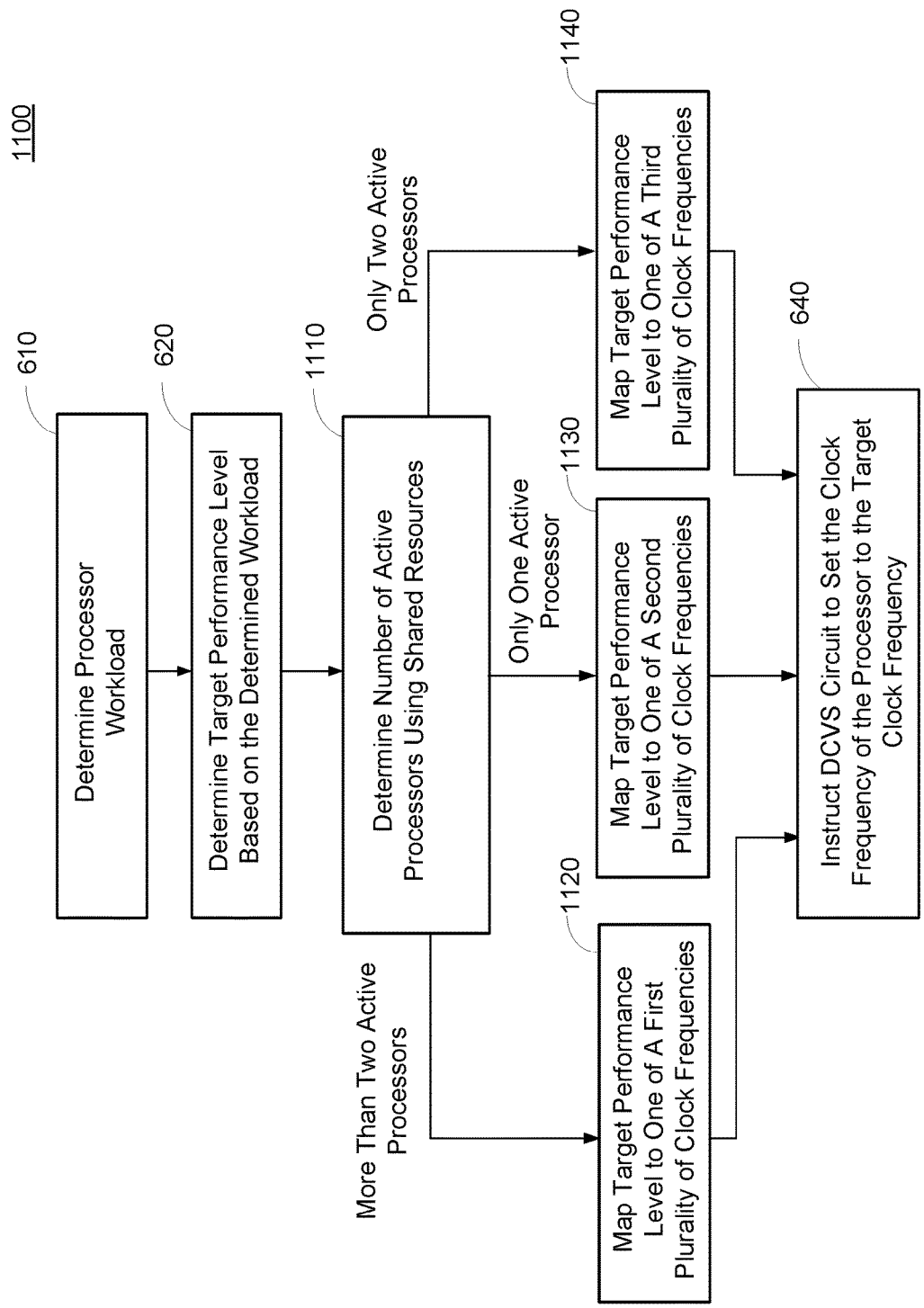
FIG. 11 shows another exemplary DCVS scheme in which efficiency of shared resources is taken into account according to certain aspects of the present disclosure.

The resource manager 450 in this example may implement the DCVS scheme 1100 shown in FIG. 11 for each of one or more processors (e.g., for each of CPU 110*a* and CPU 110*b*).

The DCVS scheme 1100 includes blocks 610 and 620 from the DCVS scheme 600 in FIG. 600. Thus, the DCVS scheme 1100 includes determining the workload of the processor (e.g., CPU 110*a* or 110*b*), and determining a target performance level for the processor based on the workload, similar to the DCVS scheme 600 in FIG. 6.

In block 1110, a determination is made of the number of active processors (e.g., CPU 110*a* and/or CPU 110*b*) using shared resources (e.g., the memory interface 130). If a determination is made that more than two active processors are using the shared resources, then the DCVS scheme 1100 proceeds to block 1120. In block 1120, the target performance level determined in block 620 is mapped to one of a first plurality of clock frequencies 1210 shown in FIG. 12. For example, the target performance level may be mapped to a lowest one of the first plurality of clock frequencies 1210 that enables the processor to meet the target performance level. In this example, the first plurality of clock frequencies 1210 comprises the same clock frequencies 710-1 to 710-N as the plurality of available clock frequencies 700 in FIG. 7.

If a determination is made in block 1110 that only one processor is active and using the shared resources, then the DCVS scheme 1100 proceeds to block 1130. In block 1130, the target performance level determined in block 620 is mapped to one of a second plurality of clock frequencies 1220 shown in FIG. 12. For example, the target performance level may be mapped to a lowest one of the second plurality of clock frequencies 1220 that enables the processor to meet the target performance level.

Figure 12:
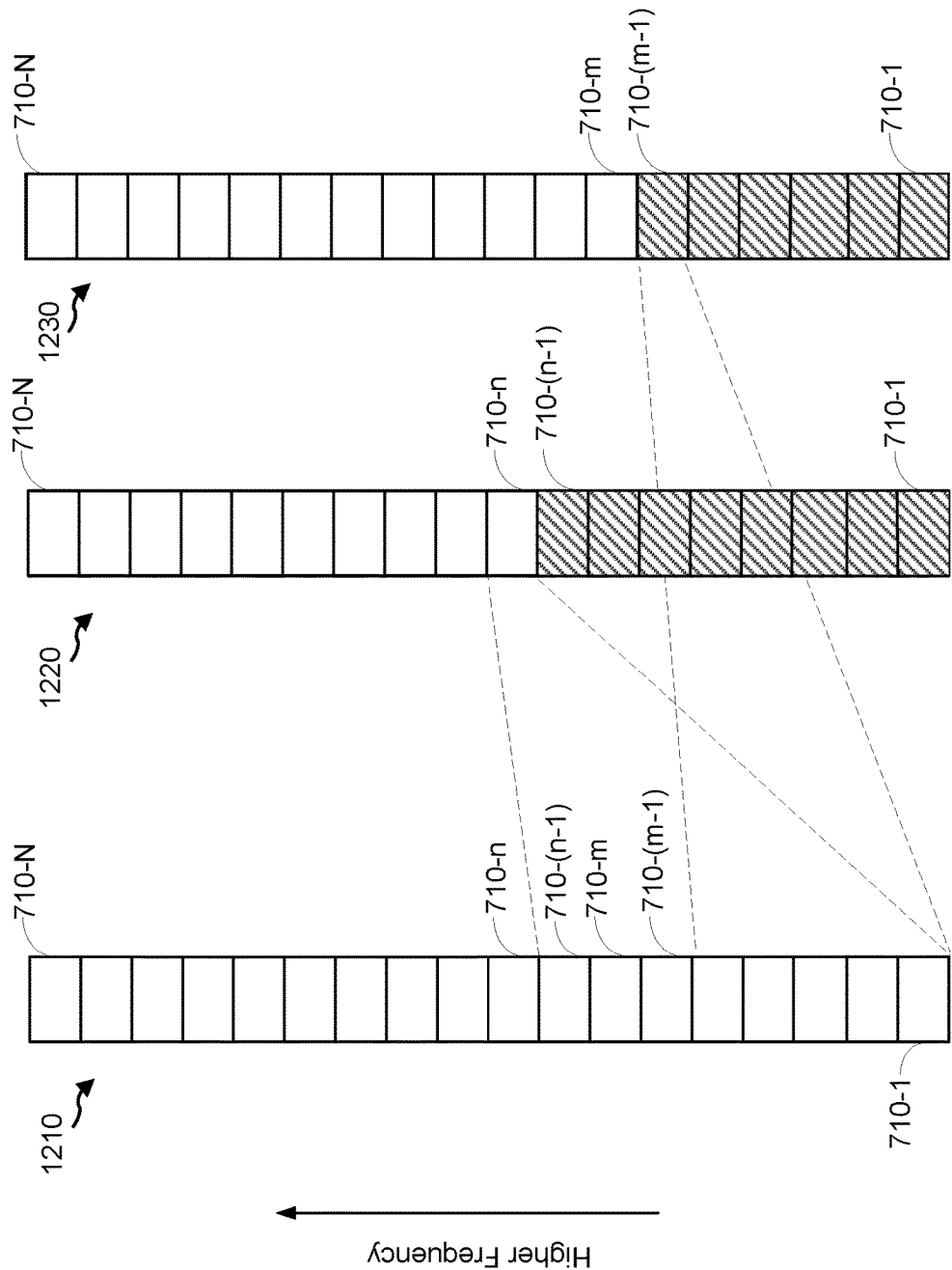
FIG. 12 shows an example of first, second and third pluralities of clock frequencies for a processor according to certain aspects of the present disclosure.

The second plurality of clock frequencies 1220 comprises clock frequencies 710-*n* to 710-N, in which the lowest (minimum) clock frequency in the second plurality of clock frequencies 1220 is clock frequency 710-*n*. The second plurality of clock frequencies 1220 excludes the clock frequencies 710-1 to 710-(*n*−1) below clock frequency 710-*n*. In other words, the clock frequencies 7101 to 710-(*n*−1) are disabled. In FIG. 12, the clock frequencies 710-1 to 710-(*n*−1) excluded from the second plurality of clock frequencies 1220 are shaded. Thus, a target performance level that is mapped to one of clock frequencies 710-1 to 710-(*n*−1) in block 1120 is instead mapped to clock frequency 710-*n* in block 1130 since clock frequency 710-*n* is the lowest (minimum) clock frequency in the second plurality of clock frequencies 1220. This is equivalent to speeding up the clock frequency of the processor relative to the clock frequency set in block 1120 for the case in which block 1120 maps the target performance level to one of clock frequencies 710-1 to 710-(*n*−1).

If a determination is made in block 1110 that only two processors are active and using the shared resources, then the DCVS scheme 1100 proceeds to block 1140. In block 1140, the target performance level determined in block 620 is mapped to one of a third plurality of clock frequencies 1230 shown in FIG. 12. For example, the target performance level may be mapped to a lowest one of the third plurality of clock frequencies 1230 that enables the processor to meet the target performance level.

The third plurality of clock frequencies 1230 comprises clock frequencies 710-*m* to 710-N, in which the lowest (minimum) clock frequency in the third plurality of clock frequencies 1230 is clock frequency 710-*m*. In this example, the lowest clock frequency 710-*m* in the third plurality of clock frequencies 1230 is below the lowest clock frequency 710-*n* in the second plurality of clock frequencies 1220. The third plurality of clock frequencies 1230 excludes the clock frequencies 710-1 to 710-(*m*−1) below clock frequency 710-*m*. In other words, the clock frequencies 7101 to 710-(*m*−1) are disabled. In FIG. 12, the clock frequencies 710-1 to 710-(*m*−1) excluded from the third plurality of clock frequencies 1230 are shaded. Thus, a target performance level that is mapped to one of clock frequencies 710-1 to 710-(*m*−1) in block 1120 is instead mapped to clock frequency 710-*m* in block 1140 since clock frequency 710-*m* is the lowest (minimum) clock frequency in the third plurality of clock frequencies 1230. This is equivalent to speeding up the clock frequency of the processor relative to the clock frequency set in block 1120 for the case in which block 1120 maps the target performance level to one of clock frequencies 710-1 to 710-(*m*−1).

The clock frequency to which the processor is mapped in block 1120, block 1130 or block 1140 may be referred to as the target clock frequency. Since each of the clock frequencies has a corresponding supply voltage, mapping the target performance level to one of the clock frequencies also maps the target performance level to the corresponding supply voltage, which may be referred to as the target supply voltage.

In block 640, the DCVS circuit (e.g., 460-1*a* or 460-1*b*) of the processor is instructed to set the clock frequency of the processor to the target clock frequency. The DCVS circuit may also be instructed to set the supply voltage of the processor to the target supply voltage.

Thus, the DCVS scheme 1100 considers the overall energy efficiency of the processor and shared resources, and therefore may provide increased overall energy efficiency compared with the DCVS scheme 600, which does not consider the energy efficiency of shared resources. When the processor (e.g., CPU 110a or CPU 110b) is the only active processor using shared resources and the DCVS scheme 600 sets the clock frequency of the processor below clock frequency 710-n, the DCVS scheme 1100 speeds up the clock frequency of the processor to clock frequency 710-n. When the processor (e.g., CPU 110a or CPU 110b) is one of only two active processors using shared resources and the DCVS scheme 600 sets the clock frequency of the processor below clock frequency 710-m, the DCVS scheme 1100 speeds up the clock frequency of the processor to clock frequency 710-m.

In one example, the resource manager 450 may perform the DCVS scheme 1100 for each one of CPU 110a and CPU 110b in FIG. 10. In this example, the processor in FIG. 11 refers to CPU 110a or CPU 110b. In this example, the resource manager 450 may determine that the respective CPU (processor in FIG. 11) is the only active processor using the shared resources when the respective CPU is active, and the multimedia processors and the other CPU are idle. The resource manager 450 may determine that the respective CPU (processor in FIG. 11) is one of only two active processors using the shared resources when both CPUs are active, and the multimedia processors are idle. The multimedia processors may include the display processor 115, the video encoder/decoder 120, the audio processor 122, and the GPU 125.

Figure 13:
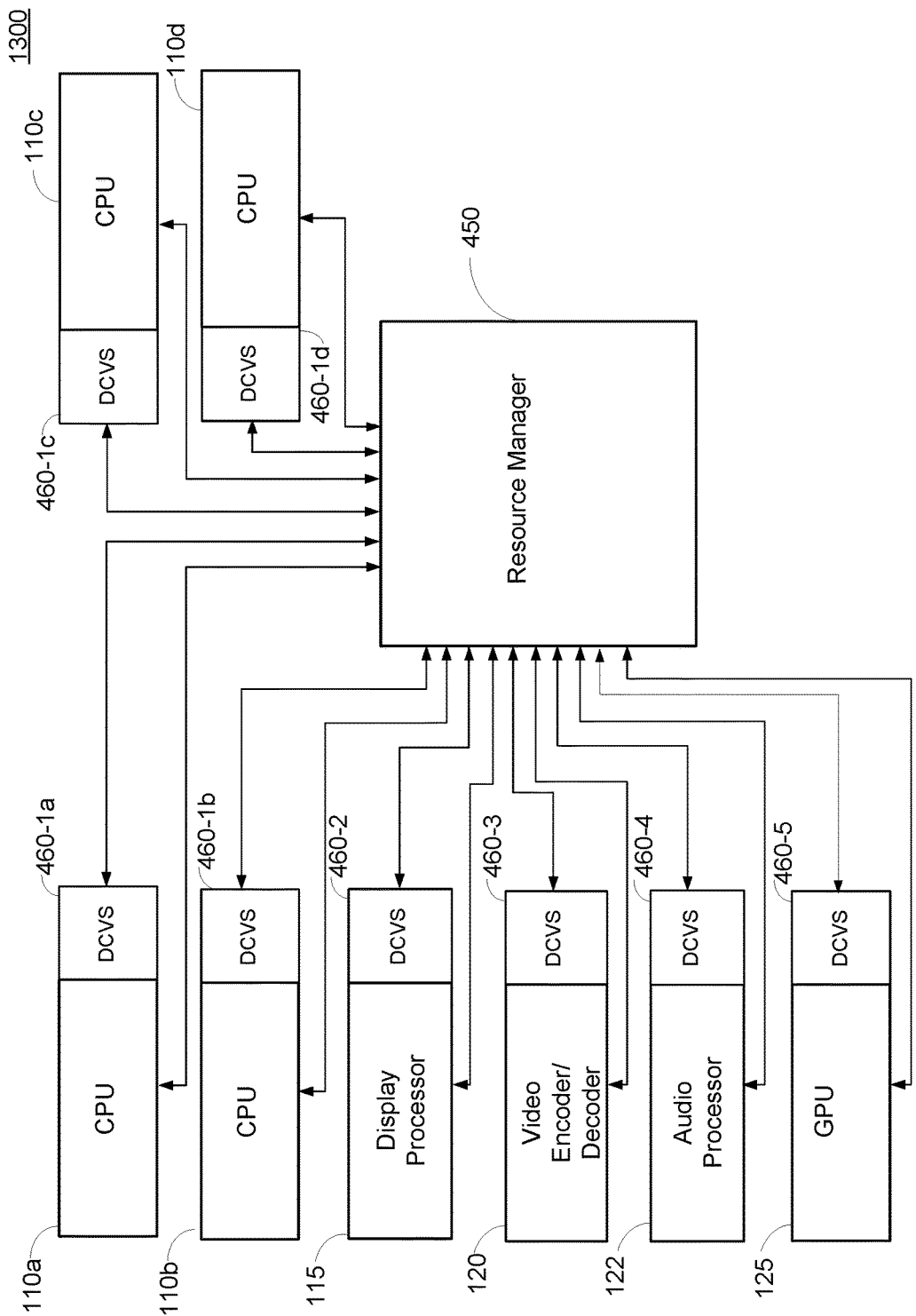
FIG. 13 shows an example of a SoC including four CPUs according to certain aspects of the present disclosure.

It is to be appreciated that embodiments of the present disclosure are not limited to the example of two CPUs, and may be extended to a SoC comprising more than two CPUs (e.g., four CPUs). In this regard, FIG. 13 shows an example of a SoC 1300 including four CPUs 110a to 110d and respective DCVS circuits 460-1a to 460-1d according to certain aspects. In this example, each of the CPUs 110a to 110d may be configured to communicate a respective state (e.g., active state, idle state, etc.) to the resource manager 450 in a manner similar to the manner discussed above with reference to FIG. 4. In this example, the SoC 1300 also includes the multimedia processors 115, 120, 122 and 125 and respective DCVS circuits 460-2 to 460-5 shown in FIG. 4. The SoC 1300 may also include the memory interface 130, which is not shown in FIG. 13 for ease of illustration.

Figure 14:
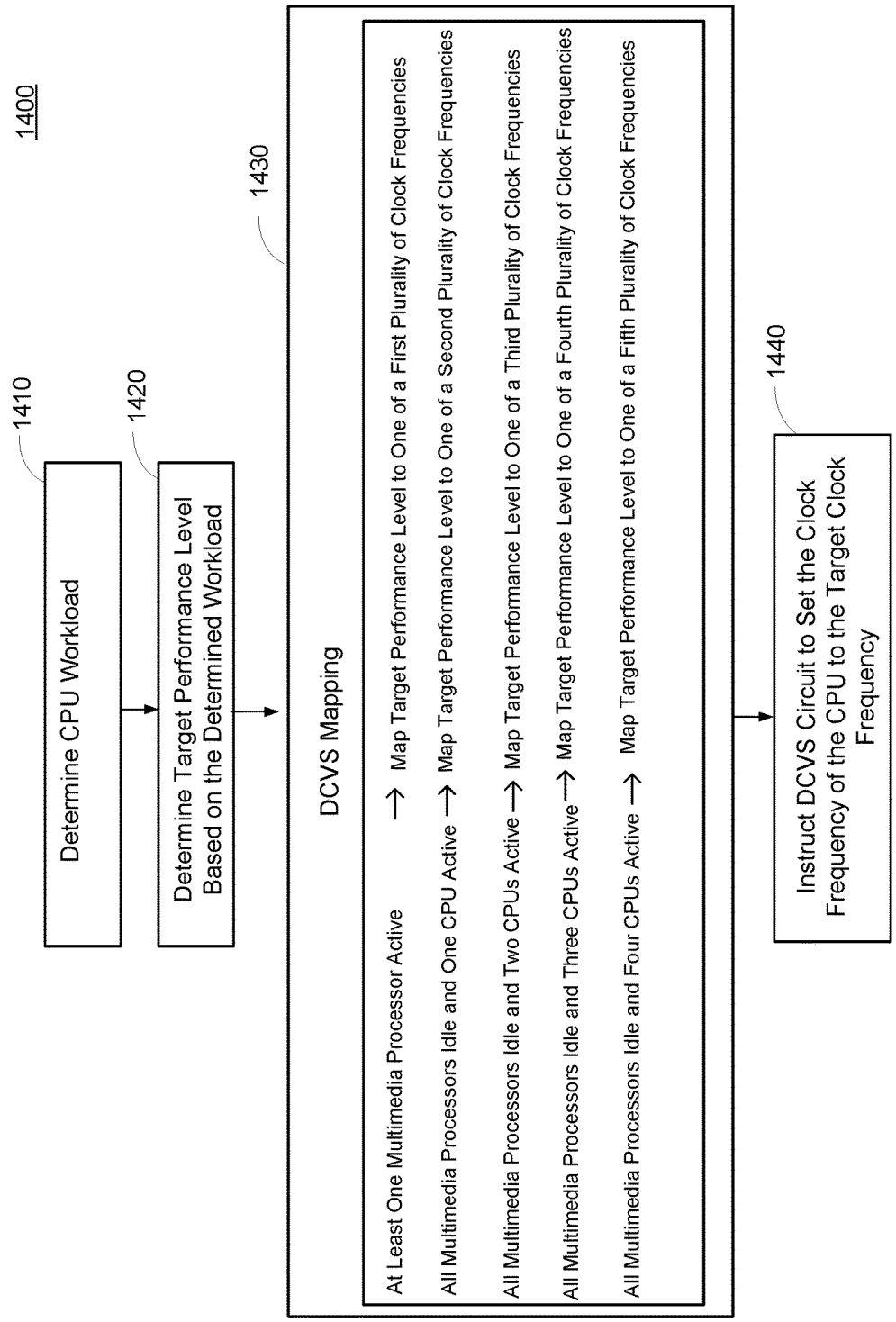
FIG. 14 shows another exemplary DCVS scheme in which efficiency of shared resources is taken into account according to certain aspects of the present disclosure.

The resource manager 450 in FIG. 13 may implement the exemplary DCVS scheme 1400 shown in FIG. 14 for each of the CPUs 110a to 110d. In block 1410, a workload of the CPU (i.e., respective one of CPUs 110a to 110d) is determined. For example, the workload of the CPU may be determined using any of the techniques discussed above with reference to FIG. 6.

In block 1420, a target performance level for the CPU is determined based on the workload of the CPU. For example, the target performance level may be determined using any of the techniques discussed above with reference to FIG. 6.

In block 1430, the target performance level is mapped to a clock frequency depending on which one of a plurality of scenarios is present. In this regard, a determination is made of which one of the plurality of scenarios is present, and the target performance level is mapped to the clock frequency based on the determined scenario.

Figure 15:
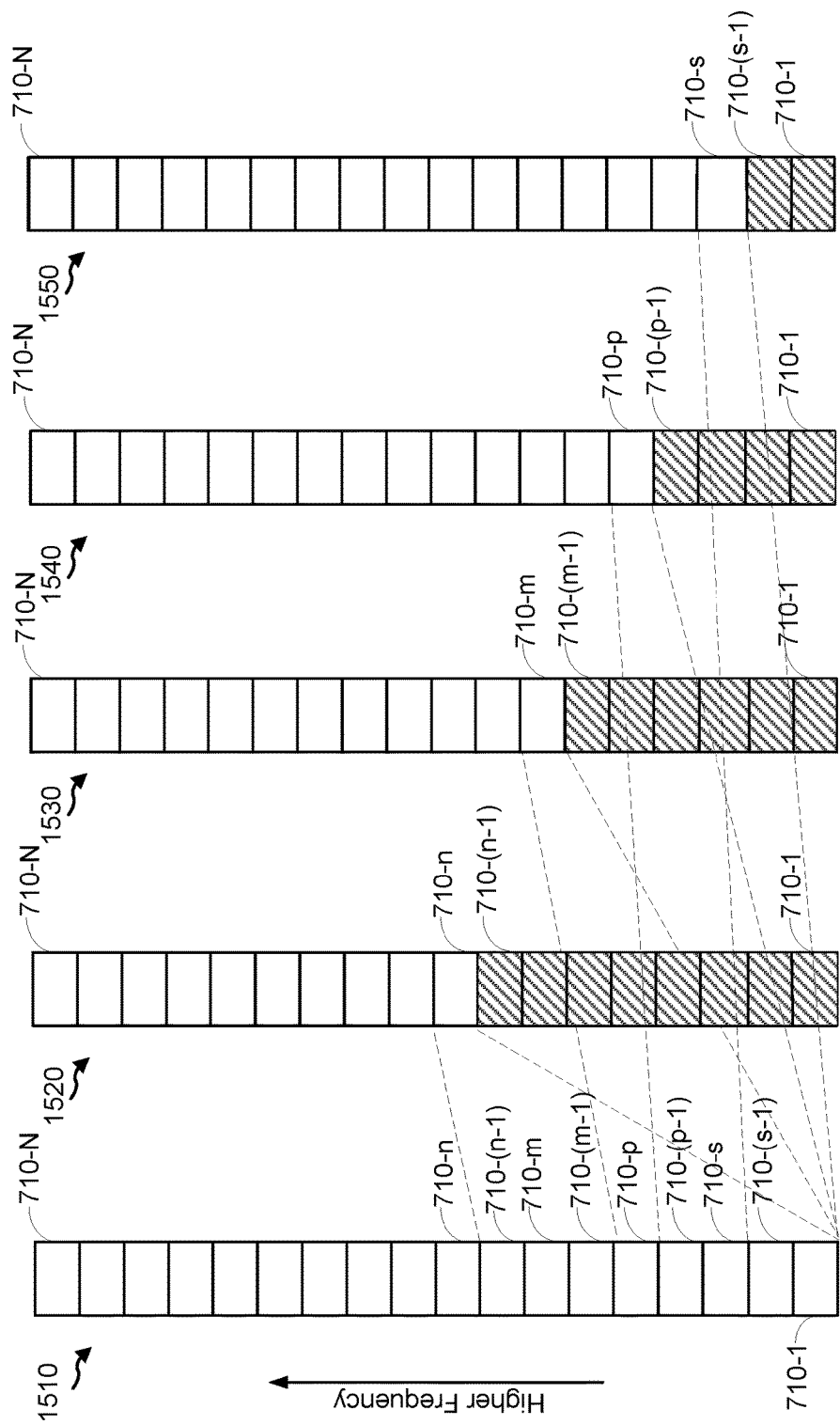
FIG. 15 shows an example of first, second, third, fourth and fifth pluralities of clock frequencies for a processor according to certain aspects of the present disclosure.

In a first one of the scenarios, at least one of the multimedia processors (e.g., display processor 115, video encoder/decoder 120, audio processor 122, and/or GPU 125) is active and using the shared resources (e.g., memory controller 135). If the first scenario is present, then the target performance level is mapped to one of a first plurality of clock frequencies 1510, an example of which is shown in FIG. 15. For example, the target performance level may be mapped to a lowest one of the first plurality of clock frequencies 1510 that enables the CPU to meet the target performance level. In this example, the first plurality of clock frequencies 1510 comprises the same clock frequencies 710-1 to 710-N as the plurality of available clock frequencies 700 in FIG. 7.

In a second one of the scenarios, the multimedia processors are idle, one CPU is active and using the shared resources, and the remaining CPUs are idle. If the second scenario is present, then the target performance level is mapped to one of a second plurality of clock frequencies 1520. For example, the target performance level may be mapped to a lowest one of the second plurality of clock frequencies 1520 that enables the CPU to meet the target performance level.

The second plurality of clock frequencies 1520 comprises clock frequencies 710-n to 710-N, in which the lowest (minimum) clock frequency in the second plurality of clock frequencies 1520 is clock frequency 710-n. The second plurality of clock frequencies 1520 excludes the clock frequencies 710-1 to 710-(n-1) below clock frequency 710-n. In other words, the clock frequencies 7101 to 710-(n-1) are disabled. In FIG. 15, the clock frequencies 710-1 to 710-(n-1) excluded from the second plurality of clock frequencies 1520 are shaded. Thus, a target performance level that is mapped to one of clock frequencies 710-1 to 710-(n-1) in the first scenario is instead mapped to clock frequency 710-n in the second scenario since clock frequency 710-n is the lowest (minimum) clock frequency in the second plurality of clock frequencies 1220. This is equivalent to speeding up the clock frequency of the CPU relative to the clock frequency set in the first scenario for the case in which the target performance level is mapped to one of clock frequencies 710-1 to 710-(n-1) in the first scenario.

In a third one of the scenarios, the multimedia processors are idle, two CPUs are active and using the shared resources, and the remaining CPUs are idle. If the third scenario is present, then the target performance level is mapped to one of a third plurality of clock frequencies 1530. For example, the target performance level may be mapped to a lowest one of the third plurality of clock frequencies 1530 that enables the CPU to meet the target performance level.

The third plurality of clock frequencies 1530 comprises clock frequencies 710-m to 710-N, in which the lowest (minimum) clock frequency in the third plurality of clock frequencies 1530 is clock frequency 710-m. In this example, the lowest clock frequency 710-m in the third plurality of clock frequencies 1530 is below the lowest clock frequency 710-n in the second plurality of clock frequencies 1520. The third plurality of clock frequencies 1530 excludes the clock frequencies 710-1 to 710-(m-1) below clock frequency 710-m. In other words, the clock frequencies 7101 to 710-(m-1) are disabled. In FIG. 15, the clock frequencies 710-1 to 710-(m-1) excluded from the third plurality of clock frequencies 1530 are shaded. Thus, a target performance level that is mapped to one of clock frequencies 710-1 to 710-(m-1) in the first scenario is instead mapped to clock frequency 710-m in the third scenario since clock frequency 710-m is the lowest (minimum) clock frequency in the third plurality of clock frequencies 1530. This is equivalent to speeding up the clock frequency of the CPU relative to the clock frequency set in the first scenario for the case in which the target performance level is mapped to one of clock frequencies 710-1 to 710-(*m*–1) in the first scenario.

In a fourth one of the scenarios, the multimedia processors are idle, three CPUs are active and using the shared resources, and the remaining CPU is idle. If the fourth scenario is present, then the target performance level is mapped to one of a fourth plurality of clock frequencies 1540. For example, the target performance level may be mapped to a lowest one of the fourth plurality of clock frequencies 1540 that enables the CPU to meet the target performance level.

The fourth plurality of clock frequencies 1540 comprises clock frequencies 710-*p* to 710-N, in which the lowest (minimum) clock frequency in the fourth plurality of clock frequencies 1540 is clock frequency 710-*p*. In this example, the lowest clock frequency 710-*p* in the fourth plurality of clock frequencies 1540 is below the lowest clock frequencies in the second and third pluralities of clock frequencies 1520 and 1530. The fourth plurality of clock frequencies 1530 excludes the clock frequencies 710-1 to 710-(*p*–1) below clock frequency 710-*p*. In other words, the clock frequencies 710-1 to 710-(*p*–1) are disabled. In FIG. 15, the clock frequencies 710-1 to 710-(*p*–1) excluded from the fourth plurality of clock frequencies 1540 are shaded. Thus, a target performance level that is mapped to one of clock frequencies 710-1 to 710-(*p*–1) in the first scenario is instead mapped to clock frequency 710-*p* in the fourth scenario since clock frequency 710-*p* is the lowest (minimum) clock frequency in the fourth plurality of clock frequencies 1540. This is equivalent to speeding up the clock frequency of the CPU relative to the clock frequency set in the first scenario for the case in which the target performance level is mapped to one of clock frequencies 710-1 to 710-(*p*–1) in the first scenario.

In a fifth one of the scenarios, the multimedia processors are idle, and all of the CPUs are active and using the shared resources. If the fifth scenario is present, then the target performance level is mapped to one of a fifth plurality of clock frequencies 1550. For example, the target performance level may be mapped to a lowest one of the fifth plurality of clock frequencies 1550 that enables the CPU to meet the target performance level.

The fifth plurality of clock frequencies 1550 comprises clock frequencies 710-*s* to 710-N, in which the lowest (minimum) clock frequency in the fifth plurality of clock frequencies 1550 is clock frequency 710-*s*. In this example, the lowest clock frequency 710-*s* in the fifth plurality of clock frequencies 1550 is below the lowest clock frequencies in the second, third and fourth pluralities of clock frequencies 1520, 1530 and 1540. The fifth plurality of clock frequencies 1550 excludes the clock frequencies 710-1 to 710-(*s*–1) below clock frequency 710-*s*. In other words, the clock frequencies 7101 to 710-(*s*–1) are disabled. In FIG. 15, the clock frequencies 710-1 to 710-(*s*–1) excluded from the fifth plurality of clock frequencies 1550 are shaded. Thus, a target performance level that is mapped to one of clock frequencies 710-1 to 710-(*s*–1) in the first scenario is instead mapped to clock frequency 710-*s* in the fifth scenario since clock frequency 710-*s* is the lowest (minimum) clock frequency in the fifth plurality of clock frequencies 1550. This is equivalent to speeding up the clock frequency of the CPU relative to the clock frequency set in the first scenario for the case in which the target performance level is mapped to one of clock frequencies 710-1 to 710-(*s*–1) in the first scenario.

The clock frequency to which the CPU is mapped in any of the scenarios may be referred to as the target clock frequency. Since each of the clock frequencies has a corresponding supply voltage, mapping the target performance level to one of the clock frequencies also maps the target performance level to the corresponding supply voltage, which may be referred to as the target supply voltage.

In block 1340, the DCVS circuit of the CPU is instructed to set the clock frequency of the CPU to the target clock frequency. The DCVS circuit may also be instructed to set the supply voltage of the CPU to the target supply voltage.

Thus, when the multimedia processors are idle, the minimum clock frequency may depend on the number of CPUs that are active and using the shared resources. In the above example, the minimum clock frequency decreases as the number of active CPUs increases. As a result, the speed boost when the multimedia processors become idle may decrease as the number of active CPUs increases. The reason for this is that the data bandwidth of a shared memory interface (e.g., memory interface 130) may increase as the number of active CPUs using the shared memory interface increases, in which the data bandwidth is an amount of data traffic through the memory interface per unit time (e.g., in units of bytes per second). At higher data bandwidth, the improvement in energy efficiency that can be achieved by speeding up the CPUs may diminish.

It is to be appreciated that the exemplary DCVS scheme 1400 is not limited to the example of four CPUs. For example, the DCVS scheme 1400 may be applied to two CPUs. In this example, the first, second and third scenarios discussed above are applicable, while the fourth and fifth scenarios may not be applicable since there are two CPUs in this example. The DCVS scheme 1400 may also be extended to a system with more than four CPUs.

Figure 16:
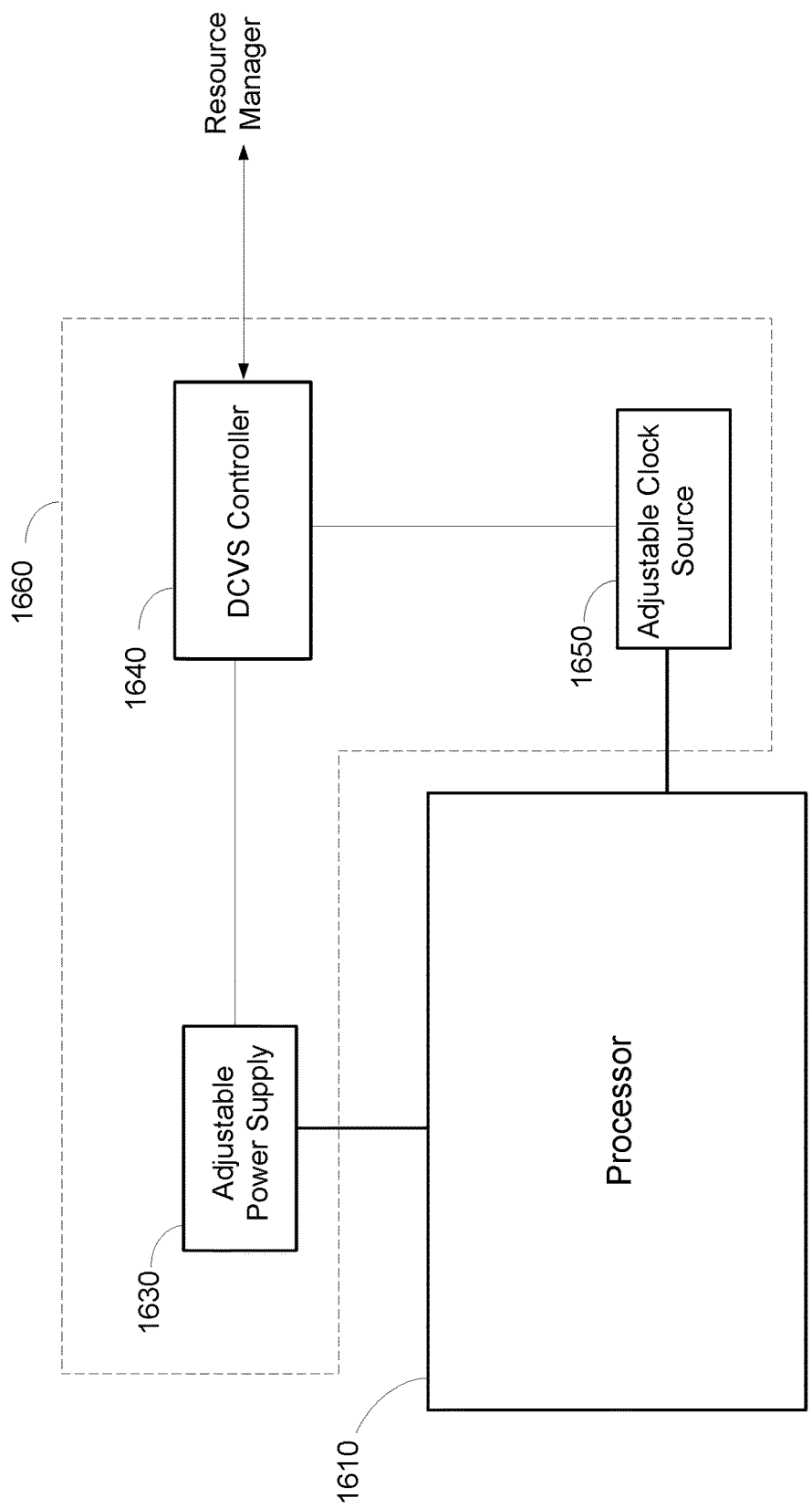
FIG. 16 shows an example of a DCVS circuit according to certain aspects of the present disclosure.

FIG. 16 shows an exemplary implementation of a DCVS circuit 1660 and a respective processor 1610. The processor 1610 may be any one of the processors 110, 115, 120, 122 and 125 shown in FIG. 4. In this example, the DCVS circuit 1660 includes an adjustable power supply 1630, an adjustable clock source 1650, and a DCVS controller 1640. The adjustable power supply 1630 is configured to provide the processor 1610 with a programmable supply voltage that can be programmed to any one of a plurality of different voltage levels. The adjustable power supply 1630 may comprise a power management integrated circuit (PMIC).

The adjustable clock source 1650 is configured to provide the processor 1610 with a clock signal having a programmable clock frequency that can be programmed to any one of a plurality of different clock frequencies. The adjustable clock source 1650 may comprise one or more phase-locked loops (PLLs), one or more frequency dividers, etc. For example, the adjustable clock source 1650 may comprise two PLLs configured to generate clock signals having different frequencies, in which the adjustable clock source 1650 may select one of the clock signals for output to the processor 1610 (e.g., using a multiplexer) depending on the desired frequency for the processor 1610. In another example, the adjustable clock source may comprise multiple frequency dividers configured to divide the frequency of a clock signal by different amounts to generate multiple clock signals having different frequencies. In this example, the adjustable clock source 1650 may be configured to select one of the clock signals for output to the processor 1610 (e.g., using a multiplexer) depending on the desired frequency for the processor 1610.

The DCVS controller 1640 is configured to program the adjustable power supply 1630 and the adjustable clock source 1650 according to the target voltage and target clock frequency determined by the resource manager 450 (not shown in FIG. 16), as discussed above. More particularly, the DCVS controller 1640 programs the adjustable power supply 1630 to output a supply voltage corresponding to the target voltage, and programs the adjustable clock source 1650 to a clock frequency corresponding to the target clock frequency.

Although not explicitly shown in FIG. 16, it is to be appreciated that a power gating device may be disposed between the adjustable power supply 1630 and the processor 1610. The power gating device may be configured to gate power from the adjustable power supply 1630 under the control of the power manager. For example, the power manager may turn off the power gating device (e.g., one or more power switches) to gate power from the adjustable power supply 1630 when the processor 1610 is idle. The power manager may turn on the power gating device when the processor 1610 is active.

Similarly, although not explicitly shown in FIG. 16, it is to be appreciated that a clock gating device may be disposed between the adjustable clock source 1650 and the processor 1610. The clock gating device may be configured to gate the clock signal from the adjustable clock source 1650 under the control of the power manager. For example, the power manager may turn off the clock gating device (e.g., one or more clock switches) to gate the clock signal when the processor 1610 is idle. The power manager may turn on the clock gating device when the processor 1610 is active.

As discussed above, the DCVS circuits 460-1 to 460-5 shown in FIG. 4 may share one or more components. For example, the DCVS circuits may share an adjustable power source (e.g., adjustable power source 1630). In this example, the adjustable power source may be configured to output a separate supply voltage to each of the processors 110, 115, 120, 122 and 125 in which the supply voltage for each of the processors can be independently programmed by the respective DCVS controller. Alternatively, the adjustable power source may output a common supply voltage to two or more of the processors. In this case, the supply voltage for the two or more processors may not be independently programmed.

In another example, the DCVS circuits may share an adjustable clock source (e.g., adjustable clock source 1650). In this example, the adjustable clock source may be configured to output a separate clock signal to each of the processors 110, 115, 120, 122 and 125 in which the frequency of the clock signal for each of the processors can be independently programmed by the respective DCVS controller. Alternatively, the adjustable clock source may output a common clock signal to two or more of the processors. In this case, the clock frequency for the two or more processors may not be independently programmed.

Figure 17:
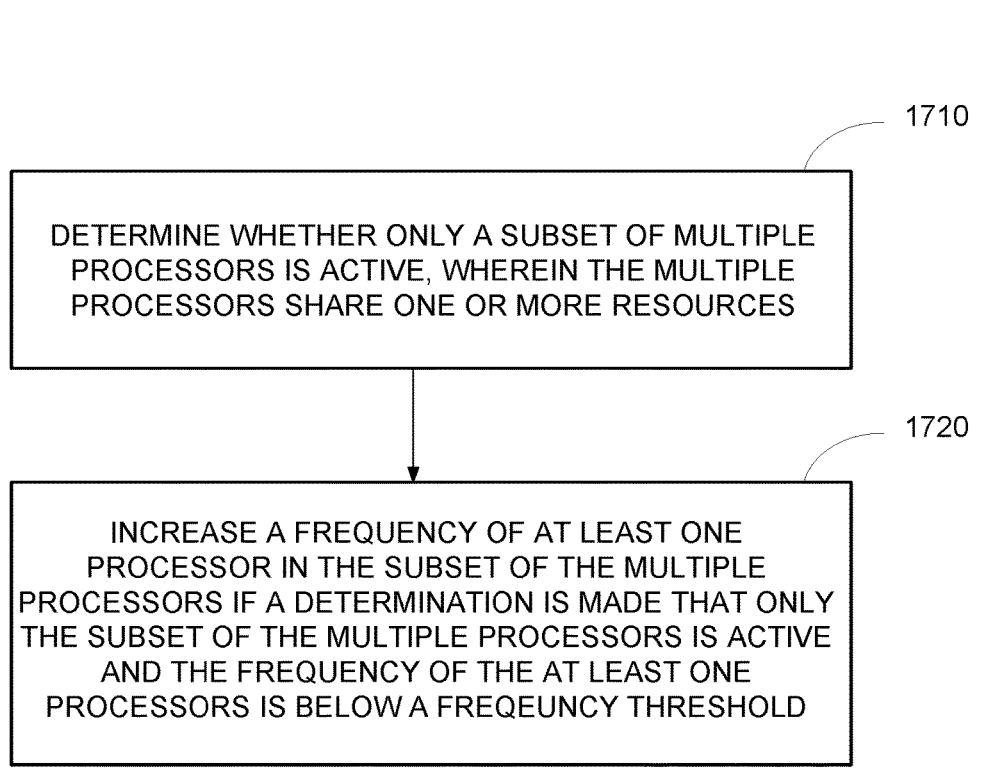
FIG. 17 is a flowchart showing a method for frequency scaling according to certain aspects of the present disclosure.

FIG. 17 is a flowchart illustrating a method 1700 of frequency scaling according to certain aspects of the present disclosure. The method 1700 may be performed by the resource manager 450.

In step 1710, a determination is made whether only a subset of multiple processors is active, wherein the multiple processors share one or more resources. For example, the multiple processors may include one or more CPUs (e.g., CPU 110) and one or more multimedia processors (e.g., display processor 115, video encoder/decoder 120, audio processor 122, GPU, etc.). In one example, the subset of the multiple processors may include the one or more CPUs, and the one or more multimedia processors may be outside the subset. In this example, a determination may be made that only the subset of the multiple processors is active when the one or more CPUs are active and the one or more multimedia processors are idle. The one or more resources may include a shared memory interface (e.g., memory interface 130) and a shared memory (e.g., memory 150).

It is to be appreciated that a determination that only a subset of the multiple processors is active does not preclude other processors on the same SoC that are not included in the multiple processors from being active. In other words, the SoC may include additional processors besides the multimedia processors mentioned above. It is also to be appreciated that the number of processors in the subset of the multiple processors is less than the number of the multiple processors. It is also to be appreciated that the term subset may refer to one of the multiple processors, two of the multiple processors, etc.

In step 1720, a frequency of at least one processor in the subset of the multiple processors is increased if a determination is made that only the subset of the multiple processors is active and the frequency of the at least one processor is below a frequency threshold. For example, the frequency (e.g., clock frequency) of at least one CPU (e.g., CPU 110) in the subset of the multiple processors may be increased by instructing a respective DCVS circuit to increase the frequency.

Figure 18:
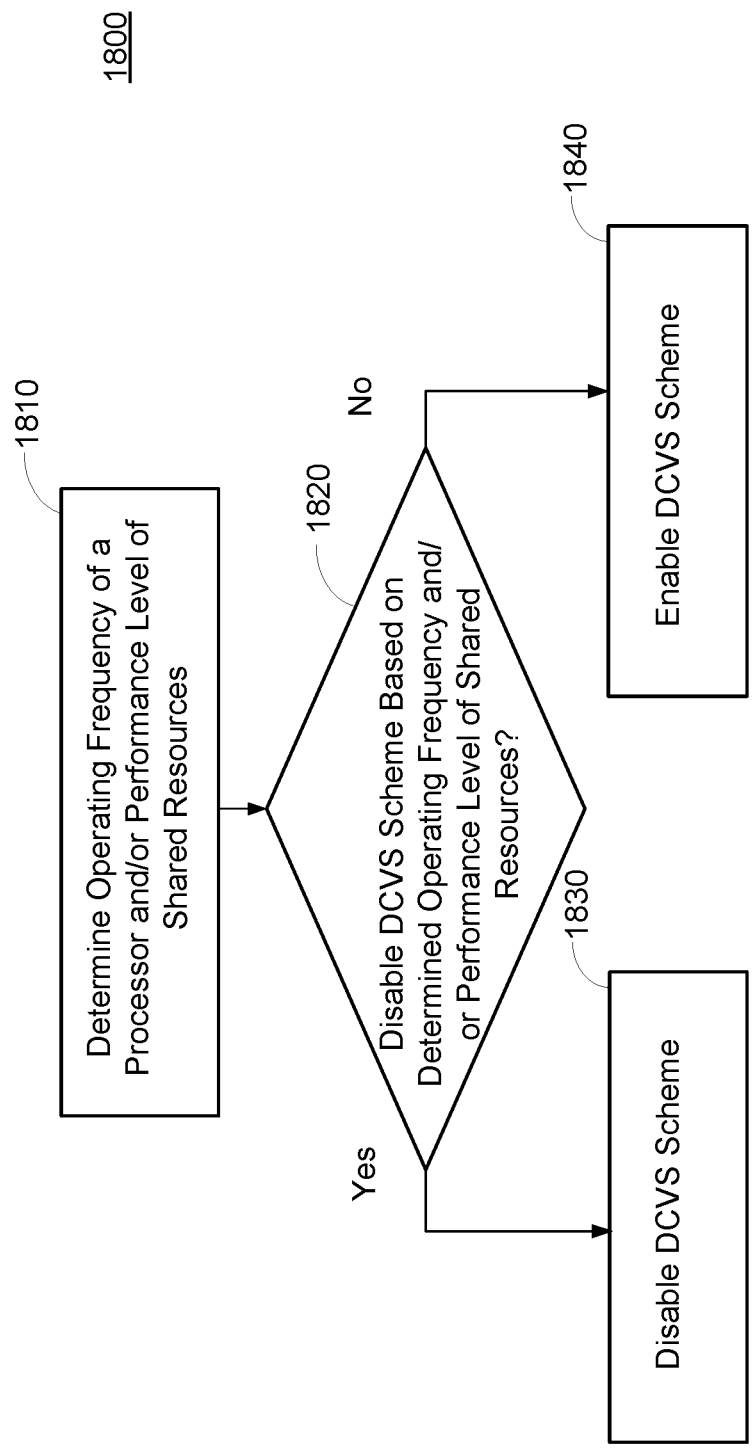
FIG. 18 shows an exemplary control mechanism for enable or disabling a DCVS scheme according to certain aspects of the present disclosure.

FIG. 18 shows an exemplary control mechanism to temporarily enable or disable a DCVS scheme for more intelligent use of the scheme depending on the operating frequency of a processor and/or operating performance level of shared resources. In some rare cases, there may be no overall power benefit from speeding up a processor or there may be an overall power increase from speeding up a processor. For example, running a processor faster may incur an increase in the frequency of the shared resources resulting in a power increase in the shared resources that is too much. In this case, power savings from the longer idle duration in the shared resource can be smaller than the power increase in the processor and the shared resource. In another case, a shared resource (e.g., shared memory) may already be running at or close to the maximum possible performance level. In this case, running the processor faster will incur traffic bottleneck from the processor to the shared resource, and the processor will have more inefficient stall time waiting to access the shared resource. These cases can be detected by comparing the monitored system status with information in a stored look-up table or based or any other detection mechanism, as discussed further below. When these cases are detected, the DCVS scheme in FIG. 8, FIG. 11, FIG. 14 or FIG. 17 can be temporarily disabled to avoid power penalty. In these cases, the conventional DCVS scheme in FIG. 6 may be used instead.

As discussed above, cases in which the DCVS scheme is to be disabled can be detected by comparing monitored system status with information in a stored look-up table. In this example, the look-up table may include operating frequencies of the processor and/or performance levels of the shared resources for which there is no overall power benefit from speeding up the processor. The operating frequencies and/or performance levels in the table may be predetermined based on power simulations and/or tests of the system. In this example, the resource manager 450 may determine whether the operating frequency of the processor and/or performance level of the shared resources are in the look-up table. If the operating frequency and/or performance level is in the look-up table, then the resource manager 450 may disable the DCVS scheme (e.g., disable the DCVS scheme in FIG. 8, FIG. 11, FIG. 14 or FIG. 17). If the operating frequency and/or performance level is not in the look-up table, then the resource manager 450 may enable the DCVS scheme (e.g., enable the DCVS scheme in FIG. 8, FIG. 11, FIG. 14 or FIG. 17).

FIG. 18 shows an exemplary control mechanism for enable or disabling a DCVS scheme according to certain aspects of the present disclosure. In block 1810, the operating frequency of a processor and/or operating performance level of shared resources is determined. In block 1820, a determination is made whether to disable the DCVS scheme (e.g., DCVS scheme in FIG. 8, FIG. 11, FIG. 14 or FIG. 17) based on the determined operating frequency and/or performance level. This may be done, for example, by comparing the operating frequency and/or performance level with operating frequencies and/or performance levels in a stored look-up table, as discussed above, or another detection mechanism may be used. If a determination is made to disable the DCVS scheme, then the DCVS scheme is disabled in block 1830. If a determination is not made to disable the DCVS scheme, them the DCVS scheme is enabled in block 1840.

It is to be appreciated that aspects of the present disclosure are not limited to the exemplary terminology used above. For example, it is to be appreciated that a DCVS scheme may also be referred to as a dynamic voltage and frequency (DVFS) scheme or other terminology. Further, it is to be appreciated that a processor may be referred to as a core or other terminology.

The resource manager 450 may be implemented in hardware, in software or a combination of the two. In a hardware implementation, the resource manager 450 may include hard-wired logic or field programmable logic configured to perform one or more of the operations discussed above. For a software implementation, the resource manager 450 may include instructions (code) stored on a storage medium and executed by a processor to perform one or more of the operations discussed above. Some examples of storage media that may be used include random access memory (RAM), read only memory (ROM), flash memory, EPROM memory, EEPROM memory, registers, a hard disk, a removable disk, and so forth.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method for frequency scaling, comprising:
    determining whether only a subset of multiple processors in a system on a chip (SoC) is active using a resource manager in the SoC, wherein the multiple processors share one or more resources and the subset is less than the number of multiple processors in the SoC, and each of the multiple processors is coupled to a respective dynamic clock and voltage scaling (DCVS) circuitry; and
    increasing a frequency of at least one processor in the subset of the multiple processors with the resource manager and respective DCVS circuitry coupled to the at least one processor if a determination is made by the resource manager that only the subset of the multiple processors is active and the remaining processors of the number of multiple processors outside the subset are idle, and the frequency of the at least one processor is below a frequency threshold;
    wherein the subset of the multiple processors includes one or more central processing units (CPUs), and one or more of the multiple processors outside the subset include at least one of a display processor, a video encoder/decoder, or a graphics processing unit (GPU), and the increasing of the frequency of the at least one processor in the subset is configured to increase an idle time of the shared one or more resources during at least one time frame by increasing the speed of the at least one processor in the subset to be able to enter an idle state at a time less than the total time duration of the least one time frame.

2. The method of claim 1, wherein the one or more resources comprise a memory and a memory controller, and the memory controller interfaces the multiple processors to the memory.

3. The method of claim 2, wherein the memory is external to a chip on which the multiple processors reside.

4. The method of claim 1, wherein increasing the frequency of the at least one processor comprises increasing the frequency of the at least one processor to the frequency threshold.

5. The method of claim 1, further comprising:
    determining a first frequency for the at least one processor based on a workload of the at least one processor; and
    setting the frequency of the at least one processor at the first frequency;
    wherein increasing the frequency of the at least one processor comprises increasing the frequency of the at least one processor from the first frequency to a second frequency if a determination is made that only the subset of the multiple processors is active and the first frequency is below a frequency threshold.

6. The method of claim 5, wherein the second frequency equals the frequency threshold.

7. The method of claim 5, further comprising decreasing the frequency of the at least one processor from the second frequency back to the first frequency if one or more of the multiple processors outside of the subset becomes active.

8. An apparatus for frequency scaling, comprising:
    means for determining whether only a subset of multiple processors in a system on a chip (SoC) is active using a resource manager in the SoC, wherein the multiple processors share one or more resources and the subset is less than the number of multiple processors in the SoC, and each of the multiple processors is coupled to a respective dynamic clock and voltage scaling (DCVS) circuitry; and
    means for increasing a frequency of at least one processor in the subset of the multiple processors with the resource manager and respective DCVS circuitry coupled to the at least one processor if a determination is made by the resource manager that only the subset of the multiple processors is active and the remaining processors of the number of multiple processors outside the subset are idle, and the frequency of the at least one processor is below a frequency threshold;
    wherein the subset of the multiple processors includes one or more central processing units (CPUs), and one or more of the multiple processors outside the subset include at least one of a display processor, a video encoder/decoder, or a graphics processing unit (GPU), and the means for increasing of the frequency of the at least one processor in the subset is configured to increase an idle time of the shared one or more resources during at least one time frame by increasing the speed of the at least one processor in the subset to be able to enter an idle state at a time less than the total time duration of the least one time frame.

9. The apparatus of claim 8, wherein the one or more resources comprise a memory and a memory controller, and the memory controller interfaces the multiple processors to the memory.

10. The apparatus of claim 9, wherein the memory is external to a chip on which the multiple processors reside.

11. The apparatus of claim 8, wherein the means for increasing the frequency of the at least one processor comprises means for increasing the frequency of the at least one processor to the frequency threshold.

12. The apparatus of claim 8, further comprising:
means for determining a first frequency for the at least one processor based on a workload of the at least one processor; and
means for setting the frequency of the at least one processor at the first frequency;
wherein the means for increasing the frequency of the at least one processor comprises means for increasing the frequency of the at least one processor from the first frequency to a second frequency if a determination is made that only the subset of the multiple processors is active and the first frequency is below a frequency threshold.

13. The apparatus of claim 12, wherein the second frequency equals the frequency threshold.

14. The apparatus of claim 12, further comprising means for decreasing the frequency of the at least one processor from the second frequency back to the first frequency if one or more of the multiple processors outside of the subset becomes active.

15. A system on a chip (SoC), comprising:
multiple processors in the SoC, wherein the multiple processors share one or more resources; and
a resource manager configured to:
determine whether only a subset of the multiple processors in the system is active wherein the subset is less than the number of multiple processors in the SoC, and each of the multiple processors is coupled to a respective dynamic clock and voltage scaling (DCVS) circuitry, and
to increase a frequency of at least one processor in the subset of the multiple processors if a determination is made by the resource manager that only the subset of the multiple processors is active and the remaining processors of the number of multiple processors outside the subset are idle, and the frequency of the at least one processor is below a frequency threshold;
wherein the subset of the multiple processors includes one or more central processing units (CPUs), and one or more of the multiple processors outside the subset include at least one of a display processor, a video encoder/decoder, or a graphics processing unit (GPU), and increasing the frequency of the at least one processor is operable for increasing an idle time during at least one time frame of one or more resources shared by the multiple processors by increasing the speed of the at least one processor in the subset to be able to enter an idle state at a time less than the total time duration of the least one time frame.

16. The system of claim 15, wherein the one or more resources comprise a memory and a memory controller, and the memory controller interfaces the multiple processors to the memory.

17. The system of claim 16, wherein the memory is external to a chip on which the multiple processors reside.

18. The system of claim 15, wherein the resource manager is configured to increase the frequency of the at least one processor to the frequency threshold.

19. The system of claim 15, wherein the resource manager is configured to determine a first frequency for the at least one processor based on a workload of the at least one processor, and set the frequency of the at least one processor at the first frequency, wherein the resource manager is configured to increase the frequency of the at least one processor from the first frequency to a second frequency if a determination is made that only the subset of the multiple processors is active and the first frequency is below a frequency threshold.

20. The system of claim 19, wherein the second frequency equals the frequency threshold.

21. The system of claim 19, wherein the resource manager is configured to decrease the frequency of the at least one processor from the second frequency back to the first frequency if one or more of the multiple processors outside of the subset becomes active.

* * * * *